US 12,090,990 B2

(12) United States Patent
Tabata et al.

(10) Patent No.: US 12,090,990 B2
(45) Date of Patent: Sep. 17, 2024

(54) VEHICLE DRIVE DEVICE AND CONTROL METHOD THEREFOR

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Tatsuya Imamura, Okazaki (JP); Yohei Habata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/659,875

(22) Filed: Apr. 20, 2022

(65) Prior Publication Data

US 2022/0410868 A1 Dec. 29, 2022

(30) Foreign Application Priority Data

Jun. 28, 2021 (JP) ................. 2021-107131

(51) Int. Cl.
  *B60W 20/15* (2016.01)
  *B60W 10/06* (2006.01)
  *B60W 10/08* (2006.01)

(52) U.S. Cl.
  CPC .......... *B60W 20/15* (2016.01); *B60W 10/06* (2013.01); *B60W 10/08* (2013.01);
  (Continued)

(58) Field of Classification Search
  CPC ...... B60W 20/15; B60W 10/06; B60W 10/08; B60W 2510/085; B60W 2710/083; B60W 2710/10
  (Continued)

(56) References Cited

U.S. PATENT DOCUMENTS

| | | | |
|---|---|---|---|
| 2013/0307329 A1* | 11/2013 | Ito ................. | A61B 6/037 307/10.1 |
| 2018/0354496 A1* | 12/2018 | Ruybal ............. | B60K 6/387 |
| 2022/0379872 A1* | 12/2022 | Morton ............. | B60W 10/26 |

FOREIGN PATENT DOCUMENTS

| | | |
|---|---|---|
| JP | 2007-246056 A | 9/2007 |
| JP | 2013-159141 A | 8/2013 |

(Continued)

*Primary Examiner* — Hunter B Lonsberry
*Assistant Examiner* — Helen Li
(74) *Attorney, Agent, or Firm* — Oblon, McClelland, Maier & Neustadt, L.L.P.

(57) ABSTRACT

It is determined whether fuel efficiency of a vehicle is improved by operating a first rotating machine to generate electricity to such an extent that an electrical path amount becomes a desired electrical path amount for controlling an operating point of an engine to a desired operating point and driving and operating a second rotating machine as a second power source, the electrical path amount being a magnitude of electric power in an electrical path through which the electric power is transferred between the first rotating machine and the second rotating machine. When the electronic control device determines that the fuel efficiency of the vehicle is improved, the first rotating machine is operated to generate electricity to such an extent that the electrical path amount becomes the desired electrical path amount and the second rotating machine is driven and operated as the second power source.

9 Claims, 11 Drawing Sheets

(52) U.S. Cl.
CPC . *B60W 2510/085* (2013.01); *B60W 2710/083* (2013.01); *B60W 2710/10* (2013.01)

(58) Field of Classification Search
USPC .......................................................... 701/22
See application file for complete search history.

(56) References Cited

FOREIGN PATENT DOCUMENTS

| | | | |
|---|---|---|---|
| JP | 2013-159326 A | 8/2013 |
| JP | 2013-163453 A | 8/2013 |
| JP | 2013-169896 A | 9/2013 |

\* cited by examiner

| AT GEAR STAGE | C1 | C2 | B1 | B2 | F1 |
|---|---|---|---|---|---|
| N, Rev | | | | | |
| 1st | ○ | | | △ | ○ |
| 2nd | ○ | | ○ | | |
| 3rd | ○ | ○ | | | |
| 4th | | ○ | ○ | | |

| NUMBER | MODE | BF1 | CF1 | D1 STATE [1] COUPLING a1-a2 | D1 STATE [2] COUPLING a1-a3 | D2 STATE [1] COUPLING N | D2 STATE [2] COUPLING a4-a6 | D2 STATE [3] COUPLING a5-a6 |
|---|---|---|---|---|---|---|---|---|
| m1 | EV (FF) HIGH | | ○ | (○) | | ○ | | |
| m2 | EV (FF) LOW | ○ | | (○) | | ○ | | |
| m3 | H4 TORQUE SPLIT | | | ○ | | | ○ | |
| m4 | H4_LSD | | ○ CONTROLLED | ○ | | | ○ | |
| m5 | H4_Lock | | | ○ | | | | ○ |
| m6 | L4_Lock | ○ | | | ○ | | | ○ |

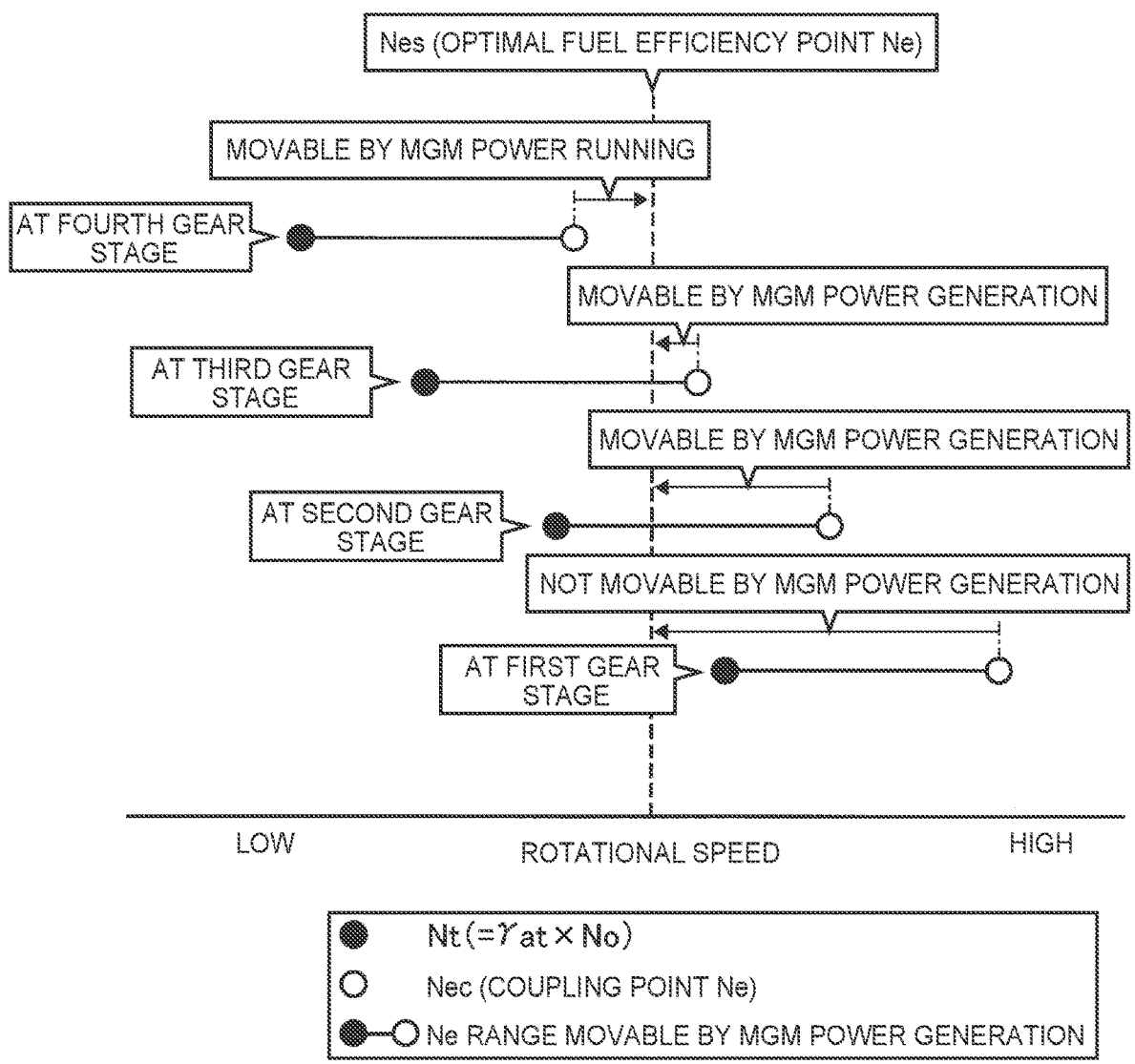

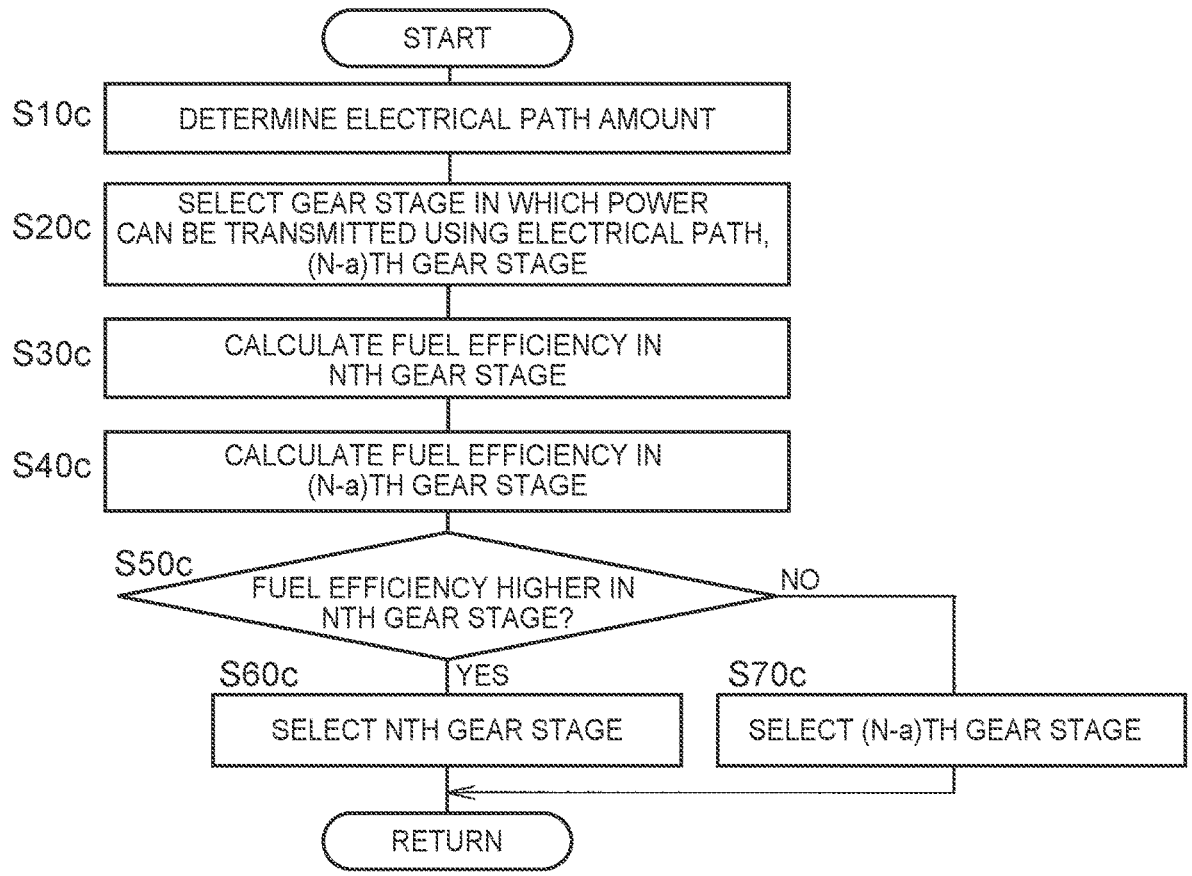
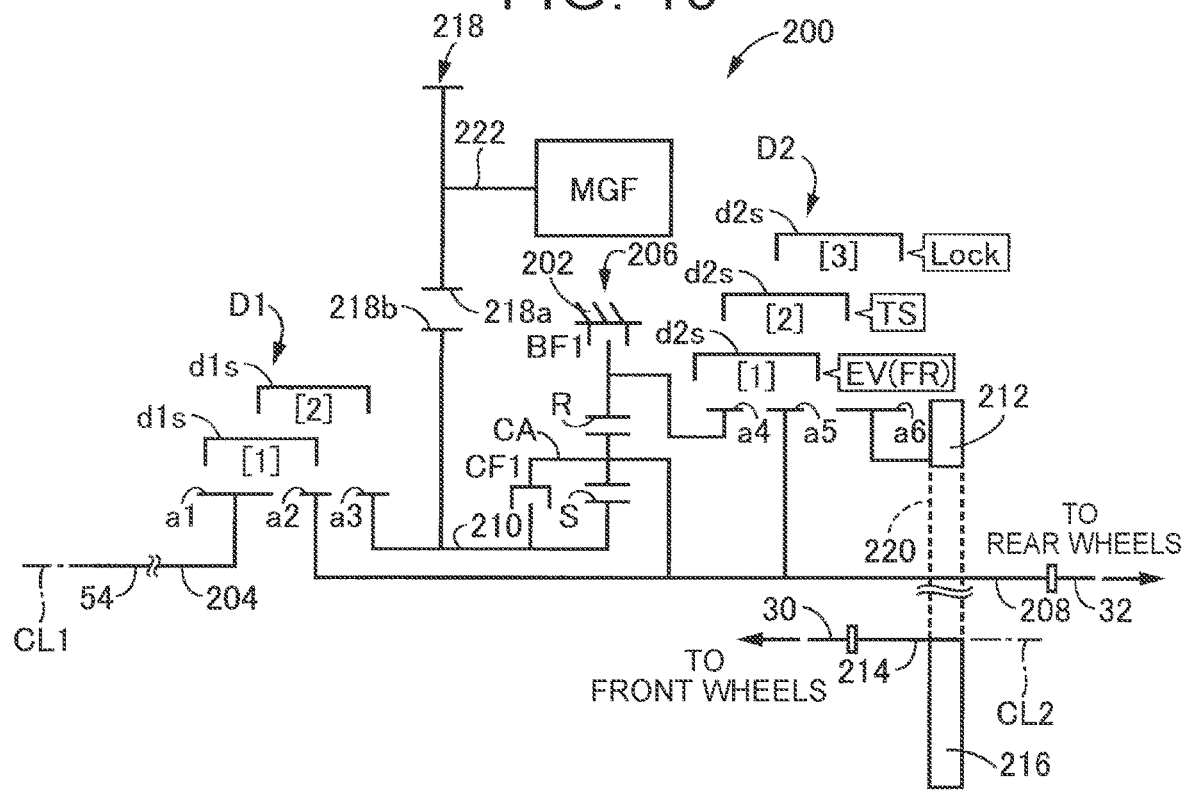

| NUMBER | MODE | BF1 | CF1 | D1 STATE | | D2 STATE | | |
|---|---|---|---|---|---|---|---|---|
| | | | | [1] | [2] | [1] | [2] | [3] |
| | | | | COUPLING | | COUPLING | | |
| | | | | a1-a2 | a1-a3 | N | a4-a6 | a5-a6 |
| m1 | EV (FR) HIGH | | ○ | (○) | | ○ | | |
| m2 | EV (FR) LOW | ○ | | (○) | | ○ | | |
| m3 | H4_TORQUE SPLIT | | | ○ | | | ○ | |
| m4 | H4_LSD | | ○ CONT-ROLLED | ○ | | | ○ | |
| m5 | H4_Lock | | | ○ | | | | ○ |
| m6 | L4_Lock | ○ | | | ○ | | | ○ |

VEHICLE DRIVE DEVICE AND CONTROL METHOD THEREFOR

CROSS-REFERENCE TO RELATED APPLICATION

This application claims priority to Japanese Patent Application No. 2021-107131 filed on Jun. 28, 2021, incorporated herein by reference in its entirety.

BACKGROUND

1. Technical Field

The present disclosure relates to a vehicle drive device including a torque splitter that distributes a part of torque of a first power source input to a first output shaft to a second output shaft via a hydraulic transmission and a control method for the vehicle drive device.

2. Description of Related Art

A vehicle drive device well known in the art includes: a first power source including an engine and a first rotating machine; a hydraulic transmission that transmits power from the first power source via a fluid; a first output shaft to which the power from the first power source is input and that outputs the power to one of front wheels and rear wheels; a second output shaft that outputs the power to the other of the front wheels and the rear wheels; a torque splitter that distributes a part of torque input to the first output shaft to the second output shaft; and a control device. An example of such a vehicle drive device is a drive control device for an all-wheel drive (AWD) vehicle described in Japanese Unexamined Patent Application Publication No. 2007-246056 (JP 2007-246056 A). JP 2007-246056 A discloses that the torque splitter includes: a second rotating machine; a differential unit including a first rotating element to which the second rotating machine is connected, a second rotating element to which one of the first output shaft and the second output shaft is connected, and a third rotating element to which the other of the first output shaft and the second output shaft is connected; and an engagement device that selectively connects any two of the first rotating element, the second rotating element, and the third rotating element. JP 2007-246056 A also discloses that the control device can control a torque split ratio, namely a ratio of distribution of torque between the front wheels and the rear wheels, by controlling output torque of the second rotating machine when the engagement device is in a disengaged state, and that the control device can use the second rotating machine as a second power source when the engagement device is in an engaged state.

SUMMARY

In this vehicle drive device, the operating point of the engine is not always controlled to an optimal fuel efficiency point determined in advance as an optimal operating point for improving fuel efficiency of the engine. When the operating point of the engine deviates from the optimal fuel efficiency point, the fuel efficiency of the engine tends to decrease. The overall fuel efficiency of a vehicle is affected by a power transmission path of the power of the engine. Therefore, controlling the operating point of the engine to the optimal fuel efficiency point may not always maximize the overall fuel efficiency of the vehicle. Therefore, there is room for improvement regarding improving the overall fuel efficiency of the vehicle.

The present disclosure provides a vehicle drive device capable of improving the overall fuel efficiency of a vehicle and a control method for the vehicle drive device.

A first aspect of the present disclosure relates to a vehicle drive device including a first power source, a hydraulic transmission, a first output shaft, a second output shaft, a torque splitter, and an electronic control device. The first power source includes an engine and a first rotating machine. The hydraulic transmission is configured to transmit power from the first power source via a fluid. The first output shaft is configured to receive the power from the first power source via the hydraulic transmission and output the power to one of a front wheel and a rear wheel. The second output shaft is configured to output the power to another of the front wheel and the rear wheel. The torque splitter is configured to distribute a part of torque input to the first output shaft to the second output shaft. The torque splitter includes a second rotating machine, a differential unit, and an engagement device. The differential unit includes a first rotating element to which the second rotating machine is connected, a second rotating element to which one of the first output shaft and the second output shaft is connected, and a third rotating element to which another of the first output shaft and the second output shaft is connected. The engagement device is configured to selectively connect any two of the first rotating element, the second rotating element, and the third rotating element. The electronic control device is configured to: when the engagement device is in a disengaged state, control a torque split ratio by controlling output torque of the second rotating machine, the torque split ratio being a ratio of distribution of torque between the front wheel and the rear wheel; when the engagement device is in an engaged state, control an operating point of the engine by adjusting an electrical path amount and using the second rotating machine as a second power source, the electrical path amount being a magnitude of electric power in an electrical path through which the electric power is transferred between the first rotating machine and the second rotating machine; determine whether fuel efficiency of a vehicle is improved by operating the first rotating machine to generate electricity to such an extent that the electrical path amount becomes a desired electrical path amount for controlling the operating point of the engine to a desired operating point and driving and operating the second rotating machine as the second power source; and when the electronic control device determines that the fuel efficiency of the vehicle is improved, operate the first rotating machine to generate electricity to such an extent that the electrical path amount becomes the desired electrical path amount and drive and operate the second rotating machine as the second power source.

According to the vehicle drive device of the first aspect, it is determined whether the fuel efficiency of the vehicle is improved by operating the first rotating machine to generate electricity to such an extent that the electrical path amount, namely the magnitude of electric power in the electrical path through which the electric power is transferred between the first rotating machine and the second rotating machine, becomes the desired electrical path amount for controlling the operating point of the engine to the desired operating point and driving and operating the second rotating machine as the second power source. When it is determined that the fuel efficiency of the vehicle is improved, the first rotating machine is operated to generate electricity to such an extent that the electrical path amount becomes the desired electrical path amount, and the second rotating machine is driven and operated as the second power source. Therefore, the overall fuel efficiency of the vehicle can be improved.

In the vehicle drive device of the first aspect, the electronic control device may be configured to, when the electronic control device determines, while the engagement device is in the disengaged state and the electronic control device is controlling the torque split ratio by controlling the output torque of the second rotating machine, that the fuel efficiency of the vehicle is improved by operating the first rotating machine to generate electricity to such an extent that the electrical path amount becomes the desired electrical path amount and driving and operating the second rotating machine as the second power source, switch the engagement device to the engaged state, operate the first rotating machine to generate electricity to such an extent that the electrical path amount becomes the desired electrical path amount, and drive and operate the second rotating machine as the second power source.

According to the vehicle drive device with the above configuration, when it is determined, while the engagement device of the torque splitter is in the disengaged state and the torque split ratio is being controlled by controlling the output torque of the second rotating machine, that the fuel efficiency of the vehicle is improved by operating the first rotating machine to generate electricity to such an extent that the electrical path amount becomes the desired electrical path amount and driving and operating the second rotating machine as the second power source, the engagement device is switched to the engaged state, the first rotating machine is operated to generate electricity to such an extent that the electrical path amount becomes the desired electrical path amount, and the second rotating machine is driven and operated as the second power source. Therefore, the overall fuel efficiency of the vehicle can be appropriately improved.

In the vehicle drive device with the above configuration, the engaged state of the engagement device may include a slip engaged state in which the engagement device is engaged with slippage, and a fully engaged state in which the engagement device is fully engaged, and the electronic control device may be configured to control the torque split ratio by controlling a control state of the engagement device to the engaged state.

According to the vehicle drive device with the above configuration, the torque split ratio, namely the ratio of distribution of the torque between the front wheel and the rear wheel, is controlled by controlling the control state of the engagement device to the engaged state. Therefore, the overall fuel efficiency of the vehicle can be appropriately improved, and torque distribution between the front and rear wheels can be maintained.

In the vehicle drive device with the above configuration, the electronic control device may be configured to: determine whether the engagement device is switchable to the engaged state; and when the electronic control device determines that the engagement device is switchable to the engaged state and determines that the fuel efficiency of the vehicle is improved by operating the first rotating machine to generate electricity to such an extent that the electrical path amount becomes the desired electrical path amount and driving and operating the second rotating machine as the second power source, switch the engagement device to the engaged state, operate the first rotating machine to generate electricity to such an extent that the electrical path amount becomes the desired electrical path amount, and drive and operate the second rotating machine as the second power source.

According to the vehicle drive device with the above configuration, when it is determined that the engagement device is switchable to the engaged state and it is determined that the fuel efficiency of the vehicle is improved by operating the first rotating machine to generate electricity to such an extent that the electrical path amount becomes the desired electrical path amount and driving and operating the second rotating machine as the second power source, the engagement device is switched to the engaged state, the first rotating machine is operated to generate electricity to such an extent that the electrical path amount becomes the desired electrical path amount, and the second rotating machine is driven and operated as the second power source. Therefore, the overall fuel efficiency of the vehicle can be appropriately improved, and torque distribution between the front and rear wheels can be appropriately maintained.

In the vehicle drive device with the above configuration, the engagement device may be a hydraulic friction engagement device. The electronic control device may be configured to determine whether the engagement device is switchable to the engaged state, based on whether a temperature of oil for operating the engagement device is within a predetermined temperature range in which an operating state of the engagement device is appropriately controlled.

According to the vehicle drive device with the above configuration, whether the engagement device is switchable to the engaged state is determined based on whether the temperature of the oil for operating the engagement device is within the predetermined temperature range. Therefore, torque distribution between the front and rear wheels can be appropriately maintained when the engagement device is switched to the engaged state.

In the vehicle drive device of the first aspect, the desired operating point may be an optimal fuel efficiency point determined in advance as an optimal operating point for improving fuel efficiency of the engine.

According to the vehicle drive device with the above configuration, the desired operating point is the optimal fuel efficiency point determined in advance as an optimal operating point for improving the fuel efficiency of the engine. Therefore, the overall fuel efficiency of the vehicle can be appropriately improved.

In the vehicle drive device of the first aspect, the electronic control device may be configured to make the determination as to whether the fuel efficiency of the vehicle is improved, when a current drive mode of the vehicle is a predetermined drive mode that focuses more on fuel efficiency performance than on power performance.

According to the vehicle drive device with the above configuration, the determination as to whether the fuel efficiency of the vehicle is improved is made when the current drive mode of the vehicle is the predetermined drive mode that focuses more on the fuel efficiency performance than on the power performance. Therefore, the overall fuel efficiency of the vehicle can be improved according to the driver's intention.

In the vehicle drive device of the first aspect, the hydraulic transmission may include a direct connection clutch that is configured to connect an input-side rotating element and an output-side rotating element. The electronic control device may be configured to, when the electronic control device determines that the fuel efficiency of the vehicle is not improved by operating the first rotating machine to generate electricity to such an extent that the electrical path amount becomes the desired electrical path amount and driving and operating the second rotating machine as the second power source, transmit power of the engine via the hydraulic transmission with the direct connection clutch in an engaged state.

According to the vehicle drive device with the above configuration, when it is determined that the fuel efficiency of the vehicle is not improved by operating the first rotating machine to generate electricity to such an extent that the electrical path amount becomes the desired electrical path amount and driving and operating the second rotating machine as the second power source, the power of the engine is transmitted via the hydraulic transmission with the direct connection clutch in the engaged state. Therefore, power loss in the hydraulic transmission can be reduced.

A second aspect of the present disclosure relates to a control method for a vehicle drive device that includes a first power source, a hydraulic transmission, a first output shaft, a second output shaft, a torque splitter. The first power source includes an engine and a first rotating machine. The hydraulic transmission is configured to transmit power from the first power source via a fluid. The first output shaft is configured to receive the power from the first power source via the hydraulic transmission and output the power to one of a front wheel and a rear wheel. The second output shaft is configured to output the power to another of the front wheel and the rear wheel. The torque splitter is configured to distribute a part of torque input to the first output shaft to the second output shaft. The torque splitter includes a second rotating machine, a differential unit, and an engagement device. The differential unit includes a first rotating element to which the second rotating machine is connected, a second rotating element to which one of the first output shaft and the second output shaft is connected, and a third rotating element to which another of the first output shaft and the second output shaft is connected. The engagement device is configured to selectively connect any two of the first rotating element, the second rotating element, and the third rotating element. The following control is performed in the control method. (i) When the engagement device is in a disengaged state, a torque split ratio is controlled by controlling output torque of the second rotating machine, the torque split ratio being a ratio of distribution of torque between the front wheel and the rear wheel; (ii) when the engagement device is in an engaged state, an operating point of the engine is controlled by adjusting an electrical path amount and using the second rotating machine as a second power source, the electrical path amount being a magnitude of electric power in an electrical path through which the electric power is transferred between the first rotating machine and the second rotating machine; (iii) it is determined whether fuel efficiency of a vehicle is improved by operating the first rotating machine to generate electricity to such an extent that the electrical path amount becomes a desired electrical path amount for controlling the operating point of the engine to a desired operating point and driving and operating the second rotating machine as the second power source; and (iv) when it is determined that the fuel efficiency of the vehicle is improved, the first rotating machine is operated to generate electricity to such an extent that the electrical path amount becomes the desired electrical path amount and the second rotating machine is driven and operated as the second power source.

According to the control method for the vehicle drive device of the second aspect, it is determined whether the fuel efficiency of the vehicle is improved by operating the first rotating machine to generate electricity to such an extent that the electrical path amount, namely the magnitude of electric power in the electrical path through which the electric power is transferred between the first rotating machine and the second rotating machine, becomes the desired electrical path amount for controlling the operating point of the engine to the desired operating point and driving and operating the second rotating machine as the second power source. When it is determined that the fuel efficiency of the vehicle is improved, the first rotating machine is operated to generate electricity to such an extent that the electrical path amount becomes the desired electrical path amount, and the second rotating machine is driven and operated as the second power source. Therefore, the overall fuel efficiency of the vehicle can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 illustrates the range of the engine speed for each AT gear stage of an automatic transmission in which an engine operating point can be moved to an optimal fuel efficiency point by a power generation operation of a TM rotating machine in the vehicle drive device of the third embodiment of the present disclosure;

FIG. 12 is a flowchart illustrating a main part of a control operation of an electronic control device in the vehicle drive device of the third embodiment of the present disclosure, and is a flowchart illustrating the control operation for improving the overall fuel efficiency of a vehicle;

FIG. 13 illustrates a schematic configuration of a transfer in the fourth embodiment;

DETAILED DESCRIPTION OF EMBODIMENTS

Hereinafter, embodiments of the present disclosure will be described in detail with reference to the drawings.

Figure 1:
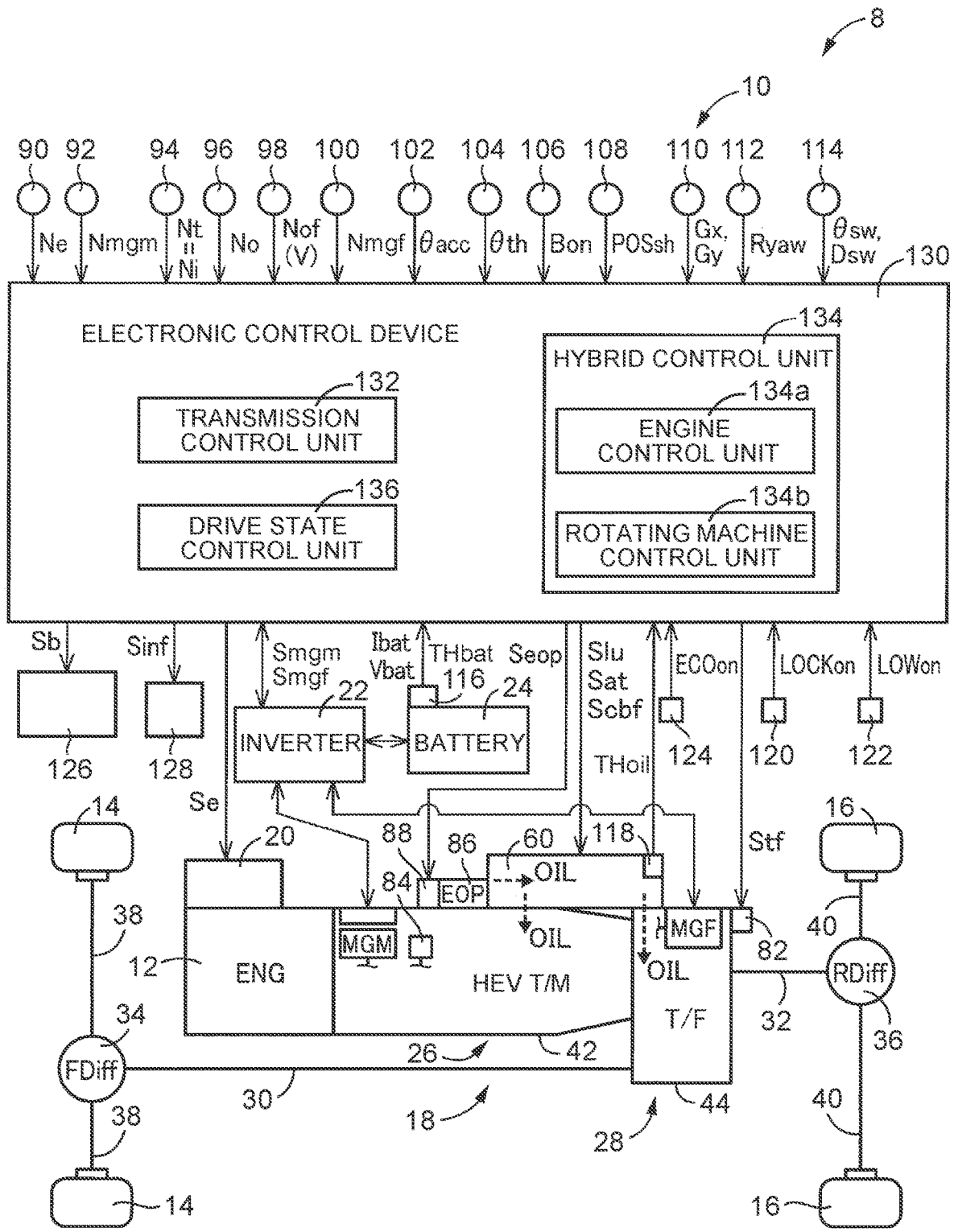
FIG. 1 illustrates a schematic configuration of a vehicle drive device according to first to fifth embodiments of the present disclosure, and illustrates a main part of control functions and a control system for various controls in the vehicle drive device.

FIG. 1 illustrates a schematic configuration of a vehicle drive device 10 included in a vehicle 8 to which a first embodiment of the present disclosure is applied, and illustrates a main part of control functions and a control system for various controls of the vehicle drive device 10. In FIG. 1, the vehicle drive device 10 includes an engine 12 (see "ENG" in the figure), a transmission (TM) rotating machine MGM, and a transfer (TF) rotating machine MGF that function as power sources. The vehicle 8 is therefore a hybrid electric vehicle (HEV). The vehicle drive device 10 includes a pair of right and left front wheels 14, a pair of right and left rear wheels 16, and a transmission system 18. The transmission system 18 is a vehicle transmission system that transmits power from the engine 12 etc. to the front wheels 14 and the rear wheels 16. The engine 12, the TM rotating machine MGM, and the TF rotating machine MGF are simply referred to as the "power sources PU" unless specifically identified. The engine 12 and the TM rotating machine MGM that output power to a torque converter 48 and an automatic transmission 50 are a first power source PU1. The TM rotating machine MGM included in the first power source PU1 is a first rotating machine. The TF rotating machine MGF included in a transfer 28 (see "T/F" in the figure) that will be described later is a second rotating machine, and is a second power source PU2 that is used instead of or in addition to the first power source PU1.

The vehicle 8 is an all-wheel drive vehicle capable of distributing a part of the torque to be transferred to the rear wheels 16 by the vehicle drive device 10 to the front wheels 14. The vehicle drive device 10 is also capable of front wheel drive in which it transfers torque only to the front wheels 14, in addition to rear wheel drive in which it transfers torque only to the rear wheels 16. Since the vehicle 8 is a vehicle with four wheels, namely the two front wheels 14 and the two rear wheels 16, the vehicle 8 is also a four-wheel drive vehicle. In the first embodiment, all-wheel drive (AWD) and four-wheel drive (4WD) have the same meaning. Rear wheel drive and front wheel drive are two-wheel drive (2WD). The front wheels 14 and the rear wheels 16 are simply referred to as the "drive wheels DW" unless specifically identified.

The engine 12 is a known internal combustion engine such as a gasoline engine or a diesel engine. For the engine 12, engine torque Te that is the output torque from the engine 12 is controlled by controlling an engine control device 20 including a throttle actuator, fuel injection equipment, and an ignition system provided in the vehicle drive device 10 by an electronic control device 130 that will be described later.

The TM rotating machine MGM and the TF rotating machine MGF are rotating electrical machines having a function as a motor for generating mechanical power from electric power and a function as a generator for generating electric power from mechanical power, and are so-called motor-generators. Each of the TM rotating machine MGM and the TF rotating machine MGF is connected to a battery 24 provided in the vehicle drive device 10 via an inverter 22 provided in the vehicle drive device 10. For the TM rotating machine MGM and the TF rotating machine MGF, each of MGM torque Tmgm that is the output torque from the TM rotating machine MGM and MGF torque Tmgf that is the output torque from the TF rotating machine MGF is controlled by controlling the inverter 22 by the electronic control device 130. Each of the MGM torque Tmgm and the MGF torque Tmgf is power running torque (the same meaning as motor torque) when the rotating machine functions as a motor, and is regenerative torque (the same meaning as power generation torque) when the rotating machine functions as a generator. The battery 24 is an energy storage device that supplies and receives electric power to and from each of the TM rotating machine MGM and the TF rotating machine MGF. The electric power has the same meaning as electrical energy unless otherwise specified. The power has the same meaning as torque and force unless otherwise specified.

The transmission system 18 includes a hybrid transmission 26 (see "HEV T/M" in the figure), the transfer 28 (see "T/F" in the figure), a front propeller shaft 30, a rear propeller shaft 32, a front differential 34 (see "FDiff" in the figure), a rear differential 36 (see "RDiff" in the figure), a pair of right and left front drive shafts 38, and a pair of right and left rear drive shafts 40. In the transmission system 18, the power from the first power source PU1 transmitted via the hybrid transmission 26 is transmitted from the transfer 28 to the rear wheels 16 sequentially through the rear propeller shaft 32, the rear differential 36, the rear drive shafts 40, etc. In the transmission system 18, when a part of the torque of the first power source PU1 transferred to the transfer 28 is distributed to the front wheel 14 side, the distributed torque is transferred to the front wheels 14 sequentially through the front propeller shaft 30, the front differential 34, the front drive shafts 38, etc.

The hybrid transmission 26 includes a transmission case 42. The transmission case 42 is a non-rotating member. The transfer 28 includes a transfer case 44 connected to the transmission case 42. The transfer case 44 is a non-rotating member. The TM rotating machine MGM is located in the transmission case 42. The TF rotating machine MGF is located in the transfer case 44.

Figures 2, 3:
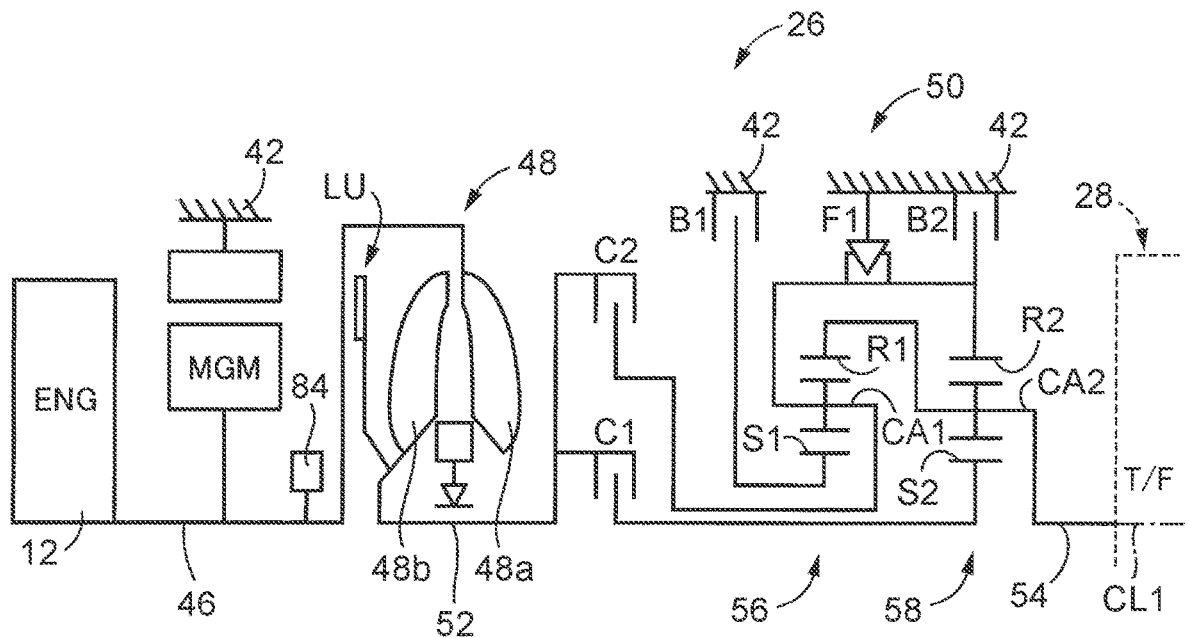
FIG. 2 illustrates a schematic configuration of a hybrid transmission in FIG. 1 (see HEV T/M in FIG. 1)
FIG. 3 is an operation engagement table illustrating the relationship between the shift operation of an automatic transmission included in the hybrid transmission of FIG. 2 and the combination of operations of engagement devices used in the automatic transmission.

FIG. 2 illustrates a schematic configuration of the hybrid transmission 26. In FIG. 2, the hybrid transmission 26 includes a rotating machine connecting shaft 46, the torque converter 48, the automatic transmission 50, etc. that are arranged on a common rotation axis CL1 in the transmission case 42. The torque converter 48 and the automatic transmission 50 are configured substantially symmetrically with respect to the rotation axis CL1, and their lower halves below the rotation axis CL1 are not shown in FIG. 2. The rotation axis CL1 is an axis of a crankshaft of the engine 12, the rotating machine connecting shaft 46 connected to the crankshaft, a transmission input shaft 52 that is an input rotating member of the automatic transmission 50, a transmission output shaft 54 that is an output rotating member of the automatic transmission 50, etc.

The rotating machine connecting shaft 46 is a rotating shaft that connects the engine 12 and the torque converter 48. The torque converter 48 includes a pump impeller 48a connected to the rotating machine connecting shaft 46 and a turbine impeller 48b connected to the transmission input shaft 52. The pump impeller 48a is an input member of the torque converter 48, and is an input-side rotating element to which the first power source PU1 is connected so that power can be transmitted from the first power source PU1 to the pump impeller 48a. The turbine impeller 48b is an output member of the torque converter 48, and is an output-side rotating element connected to the drive wheels DW so that the power can be transmitted from the turbine impeller 48b to the drive wheels DW. The TM rotating machine MGM is connected to the rotating machine connecting shaft 46 so that power can be transmitted from the TM rotating machine MGM to the rotating machine connecting shaft 46. The rotating machine connecting shaft 46 is also an input rotating member of the torque converter 48. The transmission input shaft 52 is also an output rotating member of the torque converter 48 integral with a turbine shaft that is driven to rotate by the turbine impeller 48b. The torque converter 48 is a hydraulic transmission that transmits the power from the first power source PU1 to the transmission input shaft 52 via a fluid. That is, the torque converter 48 is a hydraulic transmission that transmits the power from the first power source PU1 from the pump impeller 48a to the turbine impeller 48b via a fluid. The torque converter 48 includes a lockup clutch LU that connects the pump impeller 48a and the turbine impeller 48b. The lockup clutch LU is a direct connection clutch that connects the input and output rotating members of the torque converter 48, that is, a known lockup clutch.

The operating state, namely the control state, of the lockup clutch LU is switched by changing LU torque Tlu by an LU oil pressure PRlu. The LU torque Tlu is the torque capacity of the lockup clutch LU, and the LU oil pressure PRlu is a regulated oil pressure supplied from a hydraulic control circuit 60 (see FIG. 1) provided in the vehicle drive device 10. The hydraulic control circuit 60 is controlled by the electronic control device 130. The control state of the lockup clutch LU includes the following states: a disengaged state in which the lockup clutch LU is fully disengaged (the same meaning as a fully disengaged state), a slip engaged state in which the lockup clutch LU is engaged with slippage, and a fully engaged state in which the lockup clutch LU is fully engaged. The engaged state of the lockup clutch LU includes the slip engaged state and the fully engaged state. When the lockup clutch LU is in the disengaged state, the torque converter 48 is in a torque converter state in which the torque converter 48 performs a torque amplification function. When the lockup clutch LU is in the fully engaged state, the torque converter 48 is in a lockup state in which the pump impeller 48a and the turbine impeller 48b are rotated together.

The automatic transmission 50 is located on a power transmission path between the torque converter 48 and the transfer 28. The transmission output shaft 54 is connected to the transfer 28. The automatic transmission 50 is a mechanical transmission that transmits the power from the first power source PU1 to the transfer 28. As described above, the torque converter 48 and the automatic transmission 50 transmit the power from the first power source PU1 to the transfer 28.

The automatic transmission 50 is a known planetary gear automatic transmission that includes a plurality of sets of planetary gear units and a plurality of engagement devices. For example, the sets of planetary gear units are a first planetary gear unit 56 and a second planetary gear unit 58, and the engagement devices are a clutch C1, a clutch C2, a brake B1, and a brake B2. The engagement devices also include a one-way clutch F1. Hereinafter, the clutch C1, the clutch C2, the brake B1, and the brake B2 are simply referred to as the "engagement devices CB" unless specifically identified.

The engagement devices CB are known hydraulic friction engagement devices such as multi-plate or single-plate clutches and brakes that are pressed by a hydraulic actuator and a band brake that is tightened by the hydraulic actuator. The control state of each engagement device CB is switched to an engaged state, a disengaged state, etc. by changing CB torque Tcb by a CB oil pressure PRcb. The CB torque Tcb is the torque capacity of that engagement device CB, and the CB oil pressure PRcb is a regulated oil pressure for that engagement device CB supplied from the hydraulic control circuit 60.

In the automatic transmission 50, a part of rotating elements of the first planetary gear unit 56 and a part of rotating elements of the second planetary gear unit 58 are connected to each other either directly or indirectly via the engagement device CB or the one-way clutch F1, or the rotating elements of the first planetary gear unit 56 and the rotating elements of the second planetary gear unit 58 are connected to the transmission input shaft 52, the transmission case 42, or the transmission output shaft 54 either directly or indirectly via the engagement device CB or the one-way clutch F1. The rotating elements of the first planetary gear unit 56 are a sun gear S1, a carrier CA1, and a ring gear R1, and the rotating elements of the second planetary gear unit 58 are a sun gear S2, a carrier CA2, and a ring gear R2.

The automatic transmission 50 is a stepped transmission that forms any one of a plurality of shift stages (also referred to as gear stages) having different gear ratios $\gamma at$ (=automatic transmission (AT) input rotational speed Ni/AT output rotational speed No) by engaging one of the engagement devices CB. The gear stage that is formed by the automatic transmission 50 according to the driver's accelerator operation, the vehicle speed V, etc. is switched by the electronic control device 130. In the first embodiment, the gear stages that are formed by the automatic transmission 50 are referred to as the "AT gear stages." The AT input rotational speed Ni is the rotational speed of the transmission input shaft 52 and is the input rotational speed of the automatic transmission 50. The AT input rotational speed Ni has the same value as a turbine rotational speed Nt that is the rotational speed of the turbine shaft that is driven to rotate by the turbine impeller 48b. The AT output rotational speed No is the rotational speed of the transmission output shaft 54 and is the output rotational speed of the automatic transmission 50.

For example, as shown in an operation engagement table of FIG. 3, the AT gear stages that are formed by the automatic transmission 50 are four forward AT gear stages, namely an AT first gear stage ("1st" in the figure) to an AT fourth gear stage ("4th" in the figure). The gear ratio $\gamma at$ of the AT first gear stage is the highest, and the higher the AT gear stage, namely the closer the AT gear stage to the AT fourth gear stage capable of high-speed driving, the lower the gear ratio $\gamma at$. The operation engagement table of FIG. 3 shows the relationship between each AT gear stage and the control state of each engagement device CB. In FIG. 3, "O"

indicates engaged, "A" indicates engaged during engine braking or coast downshift of the automatic transmission 50, and a blank indicates disengaged. When the automatic transmission 50 forms an AT gear stage, the automatic transmission 50 is switched to a state in which it can transmit power, namely a power transmittable state. A neutral state of the automatic transmission 50 ("N" in the figure) is a state in which the automatic transmission 50 cannot transmit power, namely a power untransmittable state. For example, the neutral state is implemented by switching all the engagement devices CB to the disengaged state and thus cutting off power transfer in the automatic transmission 50. The automatic transmission 50 is set to the neutral state when the vehicle 8 moves rearward ("Rev" in the figure). For example, power is output from the TF rotating machine MGF when the vehicle 8 moves rearward.

Figure 4:
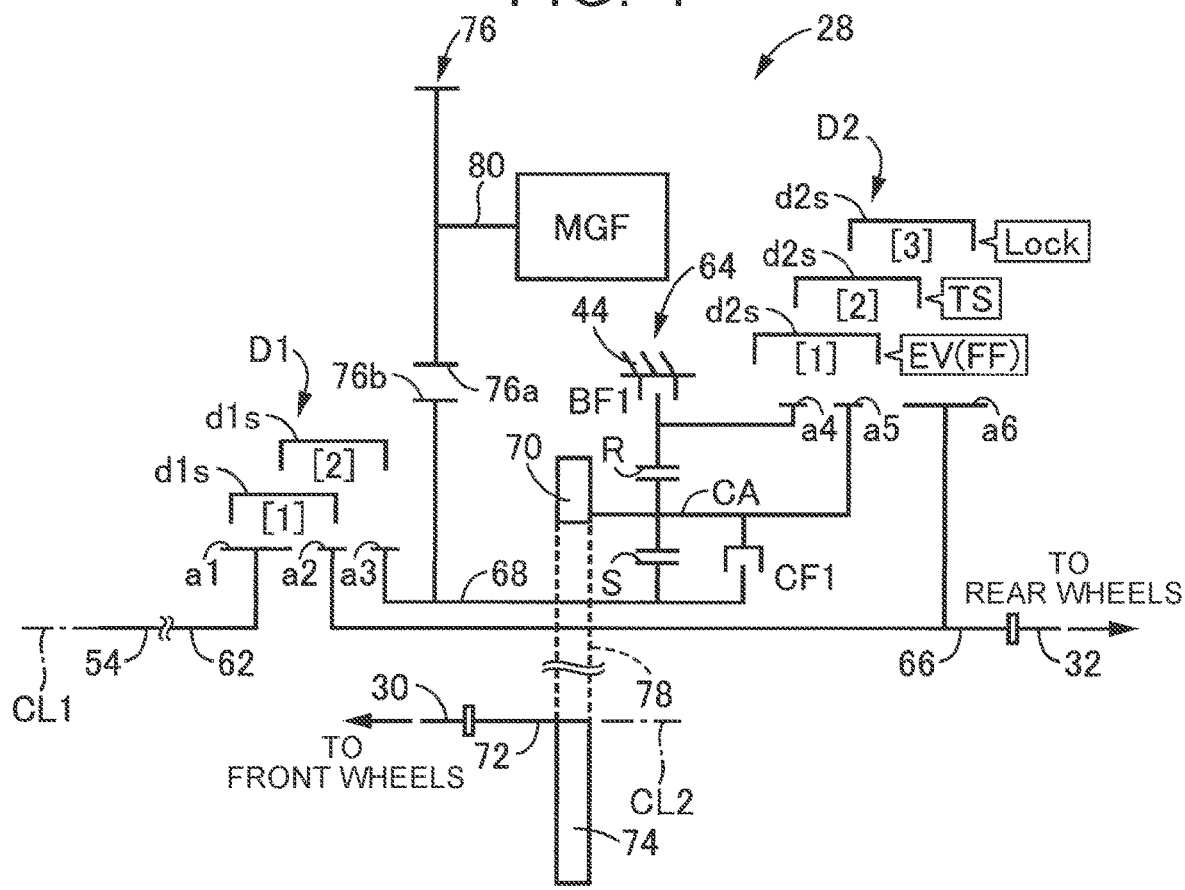
FIG. 4 illustrates a schematic configuration of a transfer in FIG. 1 (see T/F in FIG. 1)

FIG. 4 illustrates a schematic configuration of the transfer 28. In FIG. 4, the transfer 28 includes a TF input shaft 62, a differential unit 64, a TF clutch CF1, a TF brake BF1, a first output shaft 66, an intermediate shaft 68, a first positive clutch D1, a second positive clutch D2, a drive gear 70, etc. that are arranged on the common rotation axis CL1 in the transfer case 44. The differential unit 64, the TF clutch CF1, the TF brake BF1, the intermediate shaft 68, the first positive clutch D1, the second positive clutch D2, and the drive gear 70 are configured substantially symmetrically with respect to the rotation axis CL1, and their lower halves below the rotation axis CL1 are not shown in FIG. 4.

The transfer 28 further includes a second output shaft 72, a driven gear 74, etc. that are arranged on a common rotation axis CL2 in the transfer case 44. The driven gear 74 is configured substantially symmetrically with respect to the rotation axis CL2, and its upper half above the rotation axis CL2 is not shown in FIG. 4. The rotation axis CL2 is an axis of the second output shaft 72 etc.

The transfer 28 further includes the TF rotating machine MGF, a rotating machine connecting gear pair 76, a chain 78, etc. in the transfer case 44. The rotating machine connecting gear pair 76 is composed of a TF rotating machine connecting gear 76a and a TF counter gear 76b. The TF rotating machine connecting gear 76a rotates with a rotor shaft 80 of the TF rotating machine MGF, and the TF counter gear 76b constantly meshes with the TF rotating machine connecting gear 76a. The chain 78 is a member that connects the drive gear 70 and the driven gear 74.

The transfer 28 further includes a switching actuator 82 fixed to the transfer case 44 (see FIG. 1). The switching actuator 82 is an actuator for operating the first positive clutch D1 and the second positive clutch D2.

Each of the TF clutch CF1 and the TF brake BF1 is a known wet hydraulic friction engagement device that is a multi-plate or single-plate engagement device that is pressed by a hydraulic actuator. The control state of the TF clutch CF1 is switched by changing CF1 torque Tcf1 by a CF1 oil pressure PRcf1. The CF1 torque Tcf1 is the torque capacity of the TF clutch CF1, and the CF1 oil pressure PRcf1 is a regulated oil pressure for the TF clutch CF1 supplied from the hydraulic control circuit 60. The control state of the TF clutch CF1 includes the following states: a disengaged state in which the TF clutch CF1 is fully disengaged (the same meaning as a fully disengaged state), a slip engaged state in which the TF clutch CF1 is engaged with slippage, and a fully engaged state in which the TF clutch CF1 is fully engaged. The engaged state of the TF clutch CF1 includes the slip engaged state and the fully engaged state. Like the TF clutch CF1, the control state of the TF brake BF1 is also switched to an engaged state, a disengaged state, etc. by changing BF1 torque Tbf1 by a BF1 oil pressure PRbf1 supplied from the hydraulic control circuit 60. The engaged state of the TF brake BF1 is solely a fully engaged state. The first positive clutch D1 and the second positive clutch D2 are known positive clutches, that is, dog clutches. The meshing state, namely the control state, of the first positive clutch D1 and the second positive clutch D2 is switched by controlling the switching actuator 82 by the electronic control device 130.

The TF input shaft 62 is connected to the transmission output shaft 54 so that the transmission output shaft 54 can transmit power to the TF input shaft 62. The first output shaft 66 is connected to the rear propeller shaft 32 so that the first output shaft 66 can transmit power to the rear propeller shaft 32. The second output shaft 72 is connected to the front propeller shaft 30 so that the second output shaft 72 can transmit power to the front propeller shaft 30. The driven gear 74 is fixed to the second output shaft 72 so as not to be rotatable relative to the second output shaft 72. The TF counter gear 76b is fixed to the intermediate shaft 68 so as not to be rotatable relative to the intermediate shaft 68.

The differential unit 64 is a single-pinion planetary gear unit, and includes a sun gear S, a carrier CA, and a ring gear R. The sun gear S is fixed to the intermediate shaft 68 so as not to be rotatable relative to the intermediate shaft 68. Therefore, the TF rotating machine MGF is connected to the sun gear S via the rotating machine connecting gear pair 76. The carrier CA is connected to the drive gear 70. Therefore, the second output shaft 72 is connected to the carrier CA via the drive gear 70, the chain 78, and the driven gear 74. The ring gear R is selectively connected to the transfer case 44 via the TF brake BF1. The sun gear S and the carrier CA are selectively connected via the TF clutch CF1. The TF clutch CF1 is an engagement device that selectively connects the sun gear S and the carrier CA. The TF brake BF1 is an engagement device that selectively connects the ring gear R to the transfer case 44.

The first positive clutch D1 includes first meshing teeth a1, second meshing teeth a2, third meshing teeth a3, and a first sleeve d1s. The first meshing teeth a1 are fixed to the TF input shaft 62 so as not to be rotatable relative to the TF input shaft 62. The second meshing teeth a2 are fixed to the first output shaft 66 so as not to be rotatable relative to the first output shaft 66. The third meshing teeth a3 are fixed to the intermediate shaft 68 so as not to be rotatable relative to the intermediate shaft 68. The first sleeve d1s is movable relative to the first meshing teeth a1, the second meshing teeth a2, and the third meshing teeth a3 in the rotation axis CL1 direction. The rotation axis CL1 direction is a direction parallel to the rotation axis CL1. The first sleeve d1s has internal teeth capable of meshing with the first meshing teeth a1, the second meshing teeth a2, and the third meshing teeth a3 so as not to be rotatable relative to the first meshing teeth a1, the second meshing teeth a2, and the third meshing teeth a3. By moving the first sleeve d1s in the rotation axis CL1 direction by the switching actuator 82, the meshing state of the first sleeve d1s with each of the first meshing teeth a1, the second meshing teeth a2, and the third meshing teeth a3 is attained or the first sleeve d1s is switched to the non-meshing state. A first state [1] of the first positive clutch D1 indicates a state in which the first meshing teeth a1 and the second meshing teeth a2 are coupled as the first sleeve d1s meshes with the first meshing teeth a1 and the second meshing teeth a2. A second state [2] of the first positive clutch D1 indicates a state in which the first meshing teeth a1 and the third meshing teeth a3 are coupled as the first sleeve d1s meshes with the first meshing teeth a1 and the third meshing teeth a3. In FIG. 4, a plurality of the first sleeves d1s is illustrated for convenience in order to show each state.

The second positive clutch D2 includes fourth meshing teeth a4, fifth meshing teeth a5, sixth meshing teeth a6, and a second sleeve d2s. The fourth meshing teeth a4 are connected to the ring gear R. The fifth meshing teeth a5 are connected to the carrier CA. The sixth meshing teeth a6 are fixed to the first output shaft 66 so as not to be rotatable relative to the first output shaft 66. The second sleeve d2s is movable relative to the fourth meshing teeth a4, the fifth meshing teeth a5, and the sixth meshing teeth a6 in the rotation axis CL1 direction. The second sleeve d2s has internal teeth capable of meshing with the fourth meshing teeth a4, the fifth meshing teeth a5, and the sixth meshing teeth a6 so as not to be rotatable relative to the fourth meshing teeth a4, the fifth meshing teeth a5, and the sixth meshing teeth a6. By moving the second sleeve d2s in the rotation axis CL1 direction by the switching actuator 82, the meshing state of the second sleeve d2s with each of the fourth meshing teeth a4, the fifth meshing teeth a5, and the sixth meshing teeth a6 is attained or the second sleeve d2s is switched to the non-meshing state. A first state [1] of the second positive clutch D2 indicates a neutral state in which the fourth meshing teeth a4, the fifth meshing teeth a5, and the sixth meshing teeth a6 are not coupled as the second sleeve d2s does not mesh with any of the fourth meshing teeth a4, the fifth meshing teeth a5, and the sixth meshing teeth a6. A second state [2] of the second positive clutch D2 indicates a state in which the fourth meshing teeth a4 and the sixth meshing teeth a6 are coupled as the second sleeve d2s meshes with the fourth meshing teeth a4 and the sixth meshing teeth a6. The first output shaft 66 is connected to the ring gear R via the second positive clutch D2 in the second state [2]. A third state [3] of the second positive clutch D2 indicates a state in which the fifth meshing teeth a5 and the sixth meshing teeth a6 are coupled as the second sleeve d2s meshes with the fifth meshing teeth a5 and the sixth meshing teeth a6. In FIG. 4, a plurality of the second sleeves d2s is illustrated for convenience in order to show each state.

Figure 5:
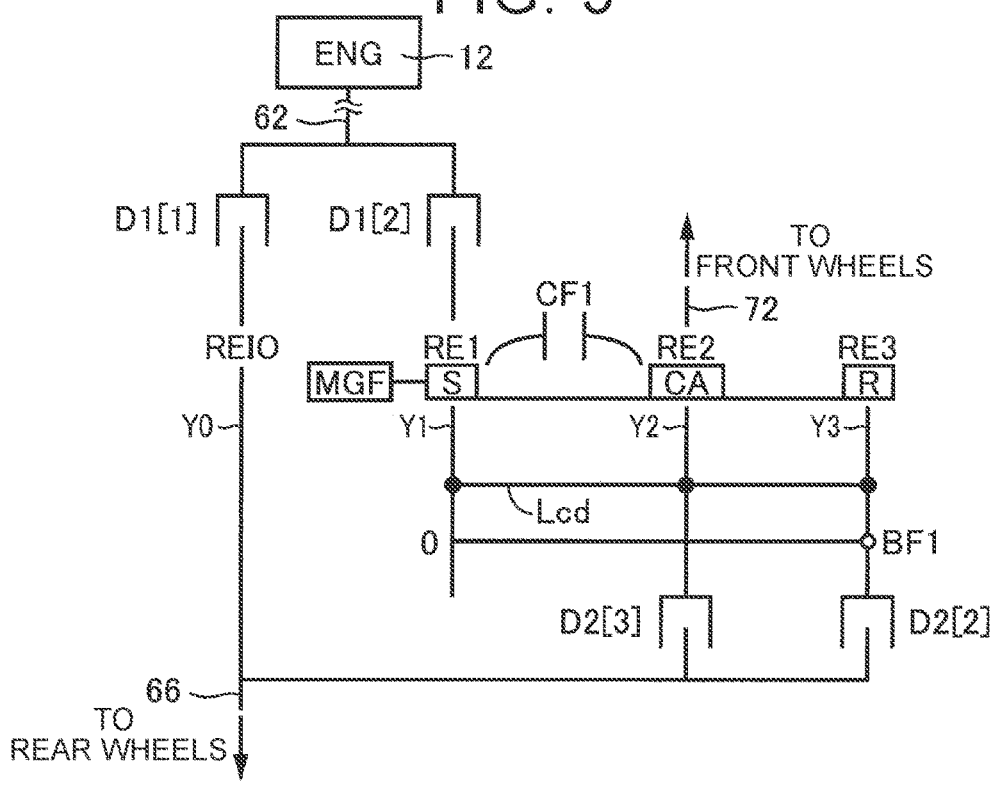
FIG. 5 is a collinear diagram showing the relative relationship among the rotational speeds of rotating elements in the transfer in FIG. 4.

FIG. 5 is a collinear diagram showing the relative relationship among the rotational speeds of the rotating elements in the transfer 28. In FIG. 5, three vertical lines Y1, Y2, and Y3 corresponding to the three rotating elements of the differential unit 64 of the transfer 28 are axes representing from left to right the rotational speed of the sun gear S that is the first rotating element corresponding to a first rotating element RE1, the rotational speed of the carrier CA that is the second rotating element corresponding to a second rotating element RE2, and the rotational speed of the ring gear R that is the third rotating element corresponding to a third rotating element RE3, respectively. A vertical line Y0 shown to the left of the vertical line Y1 is an axis representing the rotational speed of the first output shaft 66 corresponding to an input and output rotating element REIO.

As expressed using the collinear diagram of FIG. 5, in the transfer 28, the input and output rotating element REIO is selectively connected to the TF input shaft 62 via the first positive clutch D1 (see the first state [1]), and is connected to the rear propeller shaft 32. The first power source PU1 including the engine 12 is connected to the TF input shaft 62 via the hybrid transmission 26 so that the first power source PU1 can transmit power to the TF input shaft 62. In the differential unit 64, the TF rotating machine MGF is connected to the first rotating element RE1 so that the TF rotating machine MGF can transmit power to the first rotating element RE1, and the first rotating element RE1 is selectively connected to the TF input shaft 62 via the first positive clutch D1 (see the second state [2]). The second rotating element RE2 is connected to the second output shaft 72, namely the front propeller shaft 30, and is selectively connected to the first output shaft 66, namely the rear propeller shaft 32, via the second positive clutch D2 (see the third state [3]). The third rotating element RE3 is selectively connected to the first output shaft 66 via the second positive clutch D2 (see the second state [2]) and is selectively connected to the transfer case 44 via the TF brake BF1. The first rotating element RE1 and the second rotating element RE2 are selectively connected via the TF clutch CF1. In the differential unit 64, a straight line Lcd represents the relationship among the rotational speeds of the first rotating element RE1, the second rotating element RE2, and the third rotating element RE3. The first output shaft 66 is an output shaft to which the power from the first power source PU1 is input via the torque converter 48 and which outputs the power to the rear wheels 16. The second output shaft 72 is an output shaft that outputs the power to the front wheels 14.

In the differential unit 64, when the TF clutch CF1 is in the engaged state (particularly in the fully engaged state) and the TF brake BF1 is in the disengaged state, the first rotating element RE1, the second rotating element RE2, and the third rotating element RE3 are rotated together. On the other hand, in the differential unit 64, when the TF clutch CF1 is in the disengaged state and the TF brake BF1 is in the engaged state, the rotational speed of the second rotating element RE2 is reduced with respect to the rotational speed of the first rotating element RE1. Accordingly, the differential unit 64 functions as a transmission that selectively forms a high gear stage and a low gear stage. The high gear stage is formed by switching the TF clutch CF1 to the engaged state, and the low gear stage is formed by switching the TF brake BF1 to the engaged state.

The differential unit 64 can provide a differential action when both the TF clutch CF1 and the TF brake BF1 are in the disengaged state. Accordingly, the differential unit 64 functions as a center differential. In this case, when the first positive clutch D1 is in the first state [1] and the second positive clutch D2 is in the second state [2] in the transfer 28, the differential unit 64 can distribute the torque of the first power source PU1 input to the third rotating element RE3 to the second rotating element RE2 by reactive torque of the TF rotating machine MGF connected to the first rotating element RE1. The differential unit 64 can also distribute the torque of the first power source PU1 input to the third rotating element RE3 to the second rotating element RE2 by controlling the TF clutch CF1 to the engaged state (slip engaged state or fully engaged state) to limit the differential action of the differential unit 64, rather than by applying the reactive torque of the TF rotating machine MGF. As described above, the transfer 28 is a torque splitter that distributes a part of the torque of the first power source PU1 input to the first output shaft 66 to the second output shaft 72. The transfer 28 can thus distribute the torque between the front wheels 14 and the rear wheels 16. When the second positive clutch D2 of the transfer 28 is switched to the third state [3], the differential unit 64 is switched to a differential lock state in which the differential unit 64 does not function as a center differential.

Figures 6, 7:
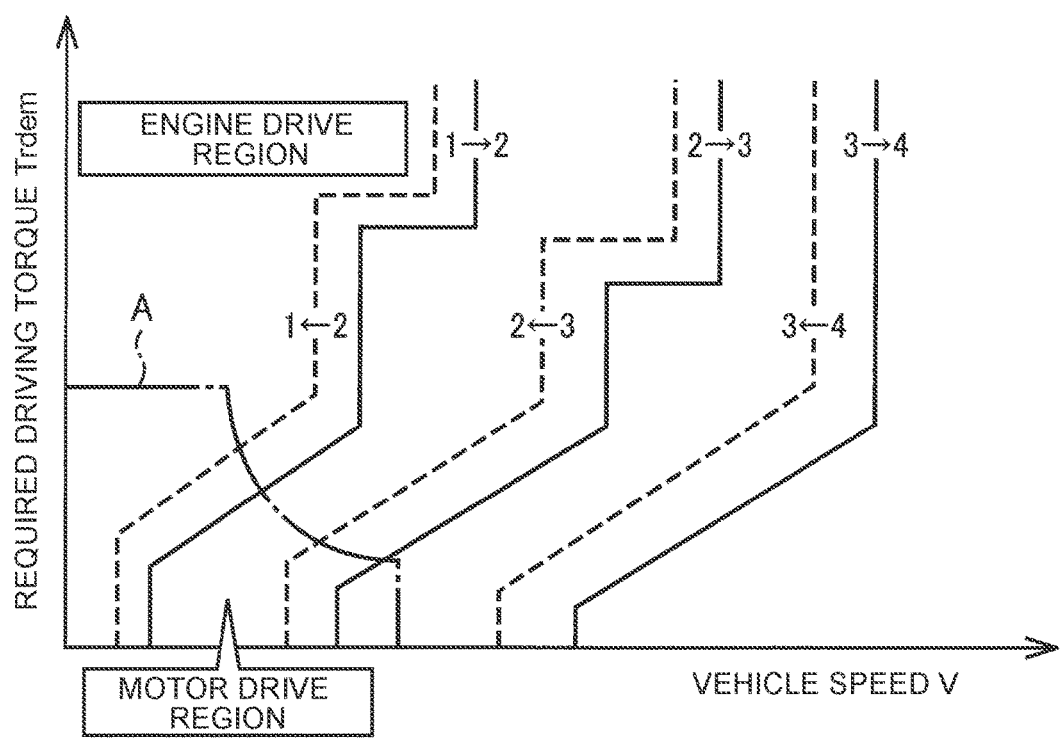
FIG. 6 is an operation engagement table illustrating the relationship between each mode established in the transfer in FIG. 4 and the control state of each engagement device in the transfer.
FIG. 7 illustrates an example of an AT gear stage shift map that is used for shift control of the automatic transmission and a drive region switch map that is used for drive mode switch control, and also illustrates the relationship between the maps.

FIG. 6 is an operation engagement table illustrating the relationship between each mode established in the transfer 28 and the control state of each engagement device in the transfer 28. In FIG. 6, "O" indicates engaged or the meshing teeth being coupled, and a blank indicates disengaged. "(O)"

indicates the box can be blank when the first positive clutch D1 can be switched to the disengaged state.

An "EV (FF) high" mode of number m1 and an "EV (FF) low" mode of number m2 is attained by switching either the TF clutch CF1 or the TF brake BF1 to the engaged state (particularly the fully engaged state) and switching the first positive clutch D1 to the first state [1] and the second positive clutch D2 to the first state [1]. Each of the "EV (FF) high" mode and the "EV (FF) low" mode is a transfer motor mode (TrEV mode) in which the vehicle 8 can perform motor running, namely the vehicle 8 can run using, for example, only the TF rotating machine MGF as a power source (battery electric vehicle (BEV) running). In the "EV (FF) high" mode and the "EV (FF) low" mode, the second positive clutch D2 is switched to the first state [1]. Coupling between the fourth meshing teeth a4, the fifth meshing teeth a5, and the sixth meshing teeth a6 is thus switched to the neutral state ("N" in the figure). Accordingly, the power transmission path between the differential unit 64 and the rear wheels 16 is disconnected. In this state, the differential unit 64 that has formed the high gear stage with the TF clutch CF1 in the engaged state or that has formed the low gear stage with the TF brake BF1 in the engaged state transmits the power from the TF rotating machine MGF to the front wheel 14 side. Accordingly, the BEV running of the first embodiment is implemented by running with front-wheel drive. In the TrEV mode, when, for example, the first positive clutch D1 is in the first state [1], dragging of the engine 12 can be eliminated by switching the automatic transmission 50 to the neutral state. Alternatively, when it is possible to switch the first positive clutch D1 to the disengaged state, dragging of the automatic transmission 50 and the engine 12 can be eliminated in the TrEV mode regardless of the state of the automatic transmission 50 by switching, for example, the first positive clutch D1 to the disengaged state. In the TrEV mode, namely in each of the "EV (FF) high" mode and the "EV (FF) low" mode, the automatic transmission 50 is in the power transmittable state, so that the automatic transmission 50 can transmit the power from the first power source PU1 to the rear wheels 16. Accordingly, the vehicle 8 can perform engine running in which the vehicle 8 runs using at least the engine 12 as a power source. Namely, the vehicle 8 can perform hybrid running (HEV running). In the engine running, the vehicle 8 can perform, for example, AWD running by parallel hybrid running, or running with rear-wheel drive using only the power from the first power source PU1.

An "H4_torque split" mode of number m3 is attained by switching both the TF clutch CF1 and the TF brake BF1 to the disengaged state and switching the first positive clutch D1 to the first state [1] and the second positive clutch D2 to the second state [2]. The "H4_torque split" mode is a mode in which, for example, with the differential unit 64 being in a state equivalent to the high gear stage, the sun gear S receives the torque of the first power source PU1 transferred from the first output shaft 66 to the differential unit 64 due to the reactive torque of the TF rotating machine MGF, so that the torque is distributed to the front wheels 14 and the rear wheels 16 at any desired ratio according to the reactive torque of the TF rotating machine MGF. In the transfer 28, the TF rotating machine MGF is caused to perform power running in the "H4_torque split" mode.

An "H4_LSD" mode of number m4 is attained by controlling the TF clutch CF1 to the engaged state (slip engaged state or fully engaged state) with the TF brake BF1 switched to the disengaged state, the first positive clutch D1 switched to the first state [1], and the second positive clutch D2 switched to the second state [2]. The "H4_LSD" mode is a mode in which torque is distributed to the front wheels 14 and the rear wheels 16 at any desired ratio according to the torque capacity of the TF clutch CF1 by controlling the TF clutch CF1 to the engaged state to limit the differential action of the differential unit 64, rather than by applying the reactive torque of the TF rotating machine MGF as in the "H4_torque split" mode. In the "H4_LSD" mode, the power from the TF rotating machine MGF can be added to driving torque Tr.

An "H4_Lock" mode of number m5 is attained by switching both the TF clutch CF1 and the TF brake BF1 to the disengaged state and switching the first positive clutch D1 to the first state [1] and the second positive clutch D2 to the third state [3]. The "H4_Lock" mode is a mode in which, with the differential unit 64 switched to the differential lock state, the torque of the first power source PU1 transferred to the first output shaft 66 is distributed to the front wheels 14 and the rear wheels 16. In the "H4_Lock" mode, the power from the TF rotating machine MGF can be added to the driving torque Tr by, for example, switching the TF clutch CF1 to the engaged state.

An "L4_Lock" mode of number m6 is attained by switching the TF clutch CF1 to the disengaged state and the TF brake BF1 to the engaged state and switching the first positive clutch D1 to the second state [2] and the second positive clutch D2 to the third state [3]. The "L4_Lock" mode is a mode in which, with the differential unit 64 switched to the differential lock state and forming the low gear stage, the torque of the first power source PU1 transferred to the sun gear S of the differential unit 64 is distributed to the front wheels 14 and the rear wheels 16. In the "L4_Lock" mode, the power from the TF rotating machine MGF can be added to the driving torque Tr.

Referring back to FIG. 1, the vehicle drive device 10 includes a mechanical oil pump (MOP) 84, an electric oil pump (EOP) 86, a pump motor 88, etc. The MOP 84 is connected to the rotating machine connecting shaft 46 (see FIG. 2). The MOP 84 is driven to rotate by the first power source PU1 and discharges hydraulic oil OIL to be used in the transmission system 18. The pump motor 88 is a motor that is exclusively for the EOP 86 and that drives the EOP 86 to rotate. The EOP 86 is driven to rotate by the pump motor 88 and discharges hydraulic oil OIL. The hydraulic oil OIL discharged by the MOP 84 and the EOP 86 is supplied to the hydraulic control circuit 60. The hydraulic control circuit 60 supplies the LU oil pressure PRlu, the CB oil pressures PRcb, the CF1 oil pressure PRcf1, the BF1 oil pressure PRbf1, etc. that are oil pressures regulated from the hydraulic oil OIL discharged from the MOP 84 and/or the EOP 86. The hydraulic oil OIL is an oil that operates the lockup clutch LU, the engagement devices CB, the TF clutch CF1, and the TF brake BF1.

The vehicle drive device 10 includes the electronic control device 130 as a controller including control devices that control the power sources PU, the transfer 28, etc. FIG. 1 shows an input and output system of the electronic control device 130 and shows a functional block diagram illustrating a main part of control functions of the electronic control device 130. The electronic control device 130 includes a so-called microcomputer including, for example, a central processing unit (CPU), a random access memory (RAM), a read-only memory (ROM), and an input and output interface. The CPU performs various controls of the vehicle drive device 10 by performing signal processing according to programs stored in advance in the ROM using a temporary storage function of the RAM. The electronic control device 130 includes computers for engine control, shift control, etc. as necessary.

Various signals etc. based on the detected values of various sensors included in the vehicle drive device 10 are supplied to the electronic control device 130 (the various sensors are, for example, an engine speed sensor 90, an MGM rotational speed sensor 92, a turbine rotational speed sensor 94, an AT output rotational speed sensor 96, a vehicle speed sensor 98, an MGF rotational speed sensor 100, an accelerator operation amount sensor 102, a throttle valve opening degree sensor 104, a brake pedal sensor 106, a shift position sensor 108, an acceleration sensor 110, a yaw rate sensor 112, a steering sensor 114, a battery sensor 116, an oil temperature sensor 118, a differential lock selection switch 120, a low gear selection switch 122, and an economy mode selection switch 124, and the various signals are, for example, an engine speed Ne that is a rotational speed of the engine 12, an MGM rotational speed Nmgm that is a rotational speed of the TM rotating machine MGM, a turbine rotational speed Nt having the same value as an AT input rotational speed Ni, an AT output rotational speed No, a TF output rotational speed Nof that is a rotational speed of the first output shaft 66 corresponding to the vehicle speed V, an MGF rotational speed Nmgf that is a rotational speed of the TF rotating machine MGF, an accelerator operation amount θacc that is the amount of accelerator operation by the driver indicating the magnitude of the driver's acceleration operation, a throttle valve opening degree θth that is an opening degree of an electronic throttle valve, a brake-on signal Bon that is a signal indicating that a brake pedal for operating a wheel brake is being operated by the driver, a shift operation position POSsh that indicates the operation position of a shift lever provided in the vehicle 8, longitudinal acceleration Gx and lateral acceleration Gy of the vehicle 8, a yaw rate Ryaw that is an angular velocity of rotation about the vertical axis of the vehicle 8, a steering angle θsw and steering direction Dsw of a steering wheel provided in the vehicle 8, a battery temperature THbat, battery charge and discharge current Ibat, and battery voltage Vbat of the battery 24, a hydraulic oil temperature THoil that is the temperature of the hydraulic oil OIL, a lock mode-on signal LOCKon that is a signal indicating that the "H4_Lock" mode or the "L4_Lock" mode has been selected by the driver, and a low gear-on signal LOWon that is a signal indicating that the low gear stage of the differential unit 64 has been selected by the driver, and an economy mode-on signal ECOon that is a signal indicating that an economy mode MReco has been selected by the driver).

For example, the differential lock selection switch 120, the low gear selection switch 122, and the economy mode selection switch 124 are provided near the driver's seat. The differential lock selection switch 120 is a switch that is turned on by the driver to switch the differential unit 64 of the transfer 28 to the differential lock state. The low gear selection switch 122 is a switch that is turned on by the driver to cause the differential unit 64 to form the low gear stage when the "H4_Lock" mode has been established in the transfer 28. The economy mode selection switch 124 is a switch that is turned on by the driver when selecting the economy mode MReco as a drive mode MR of the vehicle 8. The economy mode MReco is a predetermined drive mode MR for improving fuel efficiency performance, and is a predetermined drive mode MR that focuses more on the fuel efficiency performance than on power performance. For example, a normal mode MRnml that balances the fuel efficiency performance and the power performance is set when the economy mode MReco is not selected and is not set.

Various command signals are output from the electronic control device 130 to the devices provided in the vehicle 8 (the various command signals are, for example, an engine control command signal Se for controlling the engine 12, an MGM control command signal Smgm for controlling the TM rotating machine MGM, an MGF control command signal Smgf for controlling the TF rotating machine MGF, a hydraulic control command signal Slu for controlling the control state of the lockup clutch LU, a hydraulic control command signal Sat for controlling the control state of the engagement devices CB related to control of the automatic transmission 50, a hydraulic control command signal Scbf for controlling the control state of the TF clutch CF1 and the TF brake BF1 related to control of the transfer 28, a transfer control command signal Stf for operating the first positive clutch D1 and the second positive clutch D2 related to the control of the transfer 28, an EOP control command signal Seop for controlling the EOP 86, a brake control command signal Sb for controlling the braking force that is applied by the wheel brake, and an information notification control command signal Sinf for notifying the driver of various kinds of information, and the devices provided in the vehicle 8 are, for example, the engine control device 20, the inverter 22, the hydraulic control circuit 60, the switching actuator 82, the pump motor 88, a wheel brake device 126, and an information notification device 128.).

The electronic control device 130 includes transmission control means, hybrid control means, and drive state control means, that is, includes a transmission control unit 132, a hybrid control unit 134, and a drive state control unit 136, in order to implement various controls of the vehicle drive device 10.

The transmission control unit 132 determines shifting of the automatic transmission 50 by using, for example, such an AT gear stage shift map as shown in FIG. 7, and outputs a hydraulic control command signal Sat for performing shift control of the automatic transmission 50 to the hydraulic control circuit 60 as needed. The AT gear stage shift map represents a relationship obtained and stored in advance experimentally or by design, that is, a predetermined relationship. For example, the AT gear stage shift map represents a predetermined relationship having shift lines for determining shifting of the automatic transmission 50 on a two-dimensional coordinate system using the vehicle speed V and required driving torque Trdem as variables. In the AT gear stage shift map, the AT output rotational speed No etc. may be used instead of the vehicle speed V, or a required driving force Frdem, the accelerator operation amount θacc, the throttle valve opening degree θth, etc. may be used instead of the required driving torque Trdem. The shift lines in the AT gear stage shift map are upshift lines for determining an upshift as shown by continuous lines and downshift lines for determining a downshift as shown by dashed lines.

The hybrid control unit 134 includes a function as engine control means for controlling the operation of the engine 12, and a function as rotating machine control means for controlling the operation of the TM rotating machine MGM and the TF rotating machine MGF via the inverter 22. That is, the hybrid control unit 134 includes a function as an engine control unit 134a and a function as a rotating machine control unit 134b. The hybrid control unit 134 uses these control functions to perform hybrid drive control etc., by the engine 12, the TM rotating machine MGM, and the TF rotating machine MGF.

The hybrid control unit 134 calculates a driving amount required for the vehicle 8 by the driver by applying the accelerator operation amount θacc and the vehicle speed V to, for example, a required driving amount map that represents a predetermined relationship. The required driving amount is, for example, the required driving torque Trdem (Nm) for the drive wheels DW. The required driving amount can be the required driving force Frdem (N) for the drive wheels DW, required driving power Prdem (W) for the drive wheels DW, required AT output torque for the transmission output shaft 54, etc. When viewed from a different perspective, the required driving torque Trdem is the required driving power Prdem at the vehicle speed V at the time a command is output. Instead of the vehicle speed V, the TF output rotational speed Nof etc. may be used to calculate the required driving amount.

The hybrid control unit 134 outputs an engine control command signal Se, an MGM control command signal Smgm, and an MGF control command signal Smgf so as to achieve the required driving power Prdem in view of transfer loss, auxiliary load, the gear ratio γat of the automatic transmission 50, chargeable power Win and dischargeable power Wout of the battery 24, etc. The engine control command signal Se is, for example, a command value for achieving required engine power Pedem. The required engine power Pedem is a required value of engine power Pe for outputting engine torque Te at the engine speed Ne at the time the command is output. The engine power Pe is the output (W), namely the power, of the engine 12. The MGM control command signal Smgm is, for example, a command value for power consumption Wcmgm or power generation Wgmgm of the TM rotating machine MGM for outputting the MGM torque Tmgm at the MGM rotational speed Nmgm at the time the command is output. The MGF control command signal Smgf is, for example, a command value for power consumption Wcmgf or power generation Wgmgf of the TF rotating machine MGF for outputting the MGF torque Tmgf at the MGF rotational speed Nmgf at the time the command is output.

The chargeable power Win of the battery 24 is the maximum power that can be input to the battery 24 and that defines the limit of the input power of the battery 24. The chargeable power Win indicates the input limit of the battery 24. The dischargeable power Wout of the battery 24 is the maximum power that can be output from the battery 24 and that defines the limit of the output power of the battery 24. The dischargeable power Wout indicates the output limit of the battery 24. The chargeable power Win and dischargeable power Wout of the battery 24 are calculated by the electronic control device 130 based on, for example, the battery temperature THbat and the state of charge (SOC) (%) of the battery 24. The SOC of the battery 24 is a value indicating the level of charge corresponding to the amount of electricity stored in the battery 24, and is calculated by the electronic control device 130 based on, for example, the battery charge and discharge current Ibat and the battery voltage Vbat.

When the required driving power Prdem is in a motor drive region lower than a predetermined threshold, the hybrid control unit 134 establishes a BEV drive mode as a drive mode for driving the vehicle 8. On the other hand, when the required driving power Prdem is in an engine drive region equal to or larger than the predetermined threshold, the hybrid control unit 134 establishes an HEV drive mode as the drive mode. The BEV drive mode is a motor drive mode in which the vehicle 8 can perform the BEV running, namely the vehicle 8 can run using the TF rotating machine MGF as the second power source PU2 with the first power source PU1 stopped. The HEV drive mode is a hybrid drive mode in which the vehicle 8 can perform the engine running, namely the vehicle 8 can run using at least the engine 12 as the first power source PU1. An alternate long and short dashed line A in FIG. 7 indicates a boundary line between the engine drive region and the motor drive region. A predetermined relationship having such a boundary line as shown by the alternate long and short dashed line A in FIG. 7 is an example of a drive region switch map that is a two-dimensional coordinate system using the vehicle speed V and the required driving torque Trdem as variables. In FIG. 7, this drive region switch map is shown together with the AT gear stage shift map for convenience.

Even when the required driving power Prdem is in the motor drive region, the hybrid control unit 134 establishes the HEV drive mode when the SOC of the battery 24 is less than a predetermined engine start threshold, when the engine 12 needs to be warmed up, etc. When viewed from a different perspective, the motor drive region in the drive region switch map disappears when the SOC of the battery 24 is less than the engine start threshold or when the engine 12 needs to be warmed up. The engine start threshold is a predetermined threshold for determining that the battery 24 has such an SOC that the engine 12 needs to be automatically started to charge the battery 24.

The drive state control unit 136 determines which of the modes of the transfer 28 (see FIG. 6) to establish, based on, for example, the vehicle speed V, the accelerator operation amount θacc, the brake-on signal Bon, the shift operation position POSsh, the longitudinal acceleration Gx, the lateral acceleration Gy, the yaw rate Ryaw, the steering angle θsw, the steering direction Dsw, the lock mode-on signal LOCKon, the low gear-on signal LOWon, etc., and outputs various control command signals for establishing the determined mode. The various control command signals are, for example, a hydraulic control command signal Scbf for the TF clutch CF1 and the TF brake BF1 and a transfer control command signal Stf for the first positive clutch D1 and the second positive clutch D2.

For example, in the BEV drive mode, the drive state control unit 136 forms the low gear stage in the differential unit 64 by switching the TF brake BF1 to the engaged state and the TF clutch CF1 to the disengaged state in a relatively low vehicle speed region, and forms the high gear stage in the differential unit 64 by switching the TF brake BF1 to the disengaged state and the TF clutch CF1 to the engaged state in a relatively high vehicle speed region. That is, for example, in the BEV drive mode, the drive state control unit 136 establishes the "EV (FF) low" mode in the relatively low vehicle speed region, and establishes the "EV (FF) high" mode in the relatively high vehicle speed region. In the TrEV mode, the hybrid control unit 134 can use the MGF torque Tmgf as the driving torque Tr.

In the "H4_torque split" mode and the "H4_LSD" mode, the drive state control unit 136 determines the running state of the vehicle 8 based on various signals from various sensors such as the vehicle speed sensor 98, the acceleration sensor 110, and the yaw rate sensor 112, and sets a desired value of a torque split ratio Rx according to the determined running state. The torque split ratio Rx is the ratio of distribution of the torque of the power source PU between the front wheels 14 and the rear wheels 16. The torque split ratio Rx can be expressed by, for example, the ratio of the torque to be transferred from the power source PU to the rear wheels 16 to the total torque to be transferred from the power source PU to the rear wheels 16 and the front wheels 14, namely a rear wheel-side distribution ratio Xr. Alternatively, the torque split ratio Rx can be expressed by, for example, the ratio of the torque to be transferred from the power source PU to the front wheels 14 to the total torque to be transferred from the power source PU to the rear wheels 16 and the front wheels 14, that is, a front wheel-side distribution ratio Xf (=1−Xr).

In the "H4_torque split" mode, the drive state control unit 136 outputs an MGF control command signal Smgf for controlling the TF rotating machine MGF to control the rear wheel-side distribution ratio Xr to the desired value by adjusting the MGF torque Tmgf that generate the reactive torque of the TF rotating machine MGF. As the MGF torque Tmgf is increased, the rear wheel-side distribution ratio Xr is reduced, that is, the front wheel-side distribution ratio Xf is increased. The drive state control unit 136 can control the torque split ratio Rx by controlling the MGF torque Tmgf when the TF clutch CF1 is in the disengaged state.

In the "H4_LSD" mode, the drive state control unit 136 outputs a hydraulic control command signal Scbf for controlling the TF clutch CF1 to the engaged state (slip engaged state or fully engaged state) to control the rear wheel-side distribution ratio Xr to the desired value by adjusting the torque capacity of the TF clutch CF1. As the torque capacity of the TF clutch CF1 is increased, the rear wheel-side distribution ratio Xr is reduced. The drive state control unit 136 can control the torque split ratio Rx by controlling the control state of the TF clutch CF1 to the engaged state. In the "H4_LSD" mode, the hybrid control unit 134 can add the MGF torque Tmgf to the driving torque Tr.

The drive state control unit 136 establishes the "H4_Lock" mode when the driver turns on the differential lock selection switch 120 in the "H4_torque split" mode or the "H4_LSD" mode. In the "H4_Lock" mode, the hybrid control unit 134 can add the MGF torque Tmgf to the driving torque Tr by switching the TF clutch CF1 to the engaged state.

The drive state control unit 136 establishes the "L4_Lock" mode when the vehicle 8 is stopped and the driver turns on the low gear selection switch 122 in the "H4_Lock" mode. The hybrid control unit 134 can add the MGF torque Tmgf to the driving torque Tr in the "L4_Lock" mode.

The hybrid control unit 134 can use the TF rotating machine MGF as the second power source PU2 when the TF clutch CF1 is in the engaged state (see "EV (FF) high" mode, "H4_LSD" mode, "H4_Lock" mode, and "L4_Lock" mode).

The vehicle drive device 10 can change an engine operating point PNTeng like a continuously variable transmission. This will be described with reference to FIG. 8. The engine operating point PNTeng is an operating point of the engine 12 given by the engine speed Ne and the engine torque Te.

Figure 8:
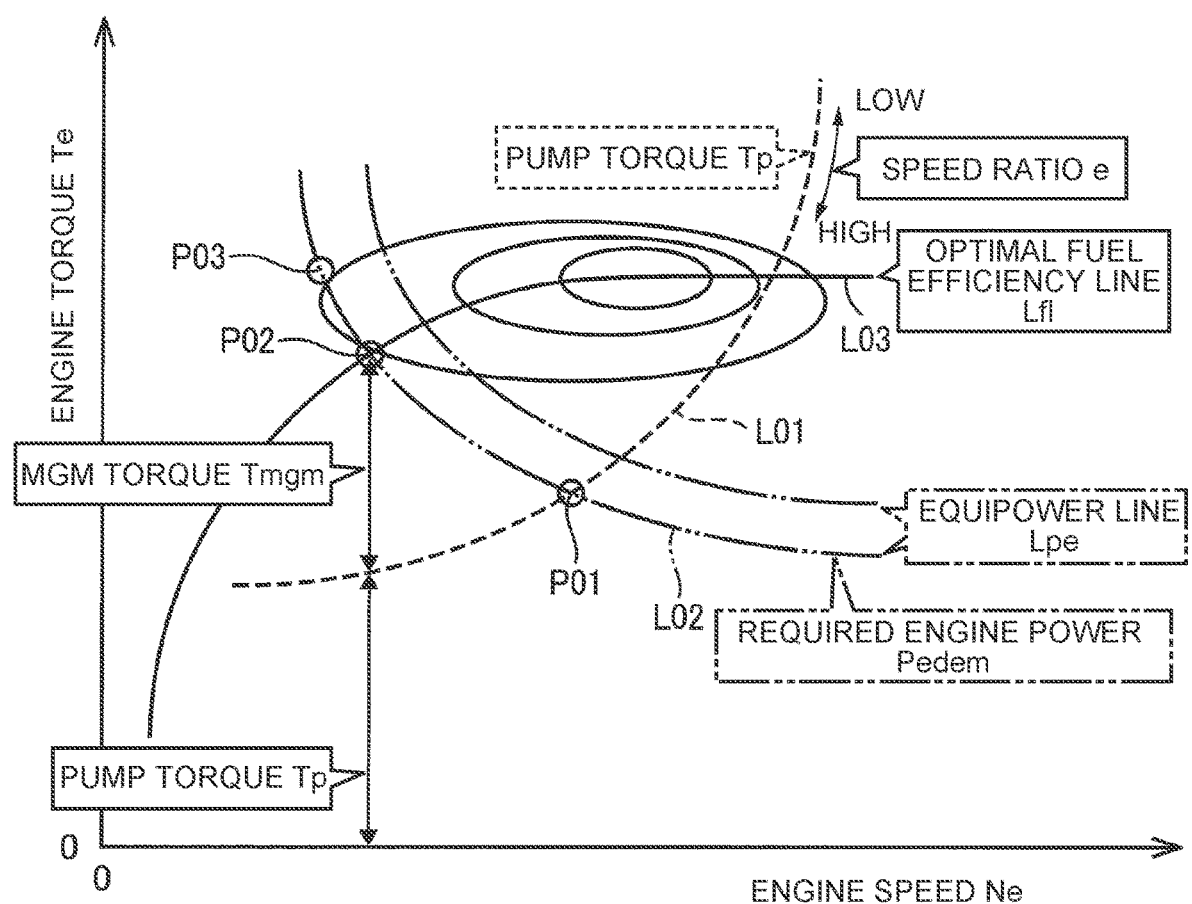
FIG. 8 is a graph illustrating an engine operating point can be changed in the vehicle drive device as in a continuously variable transmission.

In FIG. 8, each equi-power line Lpe shown by an alternate long and two short dashed line illustrates an example of the required engine power Pedem for achieving the required driving power Prdem calculated according to the accelerator operation amount θacc etc. The required engine power Pedem is the engine power Pe required by the driver's operation such as an accelerator operation. A dashed line L01 illustrates an example of pump torque Tp that is the torque generated in the pump impeller 48a according to the speed ratio e (=Nt/Np) of the torque converter 48. For convenience, the dashed line L01 is shown on a two-dimensional coordinate system using the engine speed Ne and the engine torque Te as variables. The pump rotational speed Np is the rotational speed of the pump impeller 48a and has the same value as the engine speed Ne. The relationship of the pump torque Tp with the engine speed Ne that is determined by hardware requirements is as shown by the dashed line L01 at a certain turbine rotational speed Nt. When the required engine power Pedem is, for example, an alternate long and two short dashed line L02, the engine operating point PNTeng is naturally determined to be a so-called coupling point P01 that is an intersection of the dashed line L01 and the alternate long and two short dashed line L02.

By using, for example, a part of the engine power Pe to operate the TM rotating machine MGM to generate electricity, the engine operating point PNTeng can be changed from the coupling point P01 to, for example, an optimal fuel efficiency point P02 on an optimal fuel efficiency line Lfl shown by a continuous line L03 without changing the required engine power Pedem. The optimal fuel efficiency line Lfl is a predetermined operation curve of the engine 12 that represents such a relationship between the engine speed Ne and the engine torque Te that maximizes fuel efficiency of the engine 12. The optimal fuel efficiency line Lfl is a connected set of optimal fuel efficiency points determined in advance as optimal engine operating points PNTeng for improving the fuel efficiency of the engine 12. The vehicle drive device 10 can change the engine operating point PNTeng as desired without being constrained by the turbine rotational speed Nt, by adjusting the MGM torque Tmgm so that the sum of the engine torque Te and the MGM torque Tmgm is balanced with the pump torque Tp, that is, the relationship of "Tp=Te+Tmgm (Tmgm in FIG. 8 is a negative value)" is satisfied. When the MGM torque Tmgm has a negative value, that is, when the TM rotating machine MGM is operated to generate electricity, the electric power generated by the TM rotating machine MGM is basically supplied to the TF rotating machine MGF and converted to mechanical power by the TF rotating machine MGF. The vehicle drive device 10 has an electrical path and a mechanical path as a power transmission path of the engine power Pe. The electrical path is a path through which the power is electrically transmitted by transfer of electric power between the TM rotating machine MGM and the TF rotating machine MGF. The mechanical path is a path through which the power is mechanically transmitted via the torque converter 48. In the vehicle drive device 10, an electric continuously variable transmission is formed using the TM rotating machine MGM and the TF rotating machine MGF.

The hybrid control unit 134 controls the engine operating point PNTeng by adjusting an electrical path amount Ppse (W). The electrical path amount Ppse is the magnitude of electric power in the electrical path in which the electric power is transferred between the TM rotating machine MGM and the TF rotating machine MGF. The electrical path amount Ppse is, for example, the product of the MGM torque Tmgm and the MGM rotational speed Nmgm.

The hybrid control unit 134 obtains a desired electrical path amount Ppsetgt. The desired electrical path amount Ppsetgt is an electrical path amount Ppse for controlling the engine operating point PNTeng to a desired operating point PNTtgt. The desired operating point PNTtgt is, for example, an optimal fuel efficiency point, and is the optimal fuel efficiency point P02 when the required engine power Pedem is the alternate long and two short dashed line L02 (see FIG. 8). The desired electrical path amount Ppsetgt is the product of the MGM torque Tmgm at the time of changing the engine operating point PNTeng from the coupling point to the desired operating point PNTtgt and the engine speed Ne at the desired operating point PNTtgt, that is, the MGM rotational speed Nmgm at the desired operating point PNTtgt. The hybrid control unit 134 controls the MGM torque Tmgm and drives the TF rotating machine MGF so that the electrical path amount Ppse from the TM rotating machine MGM to the TF rotating machine MGF becomes the desired electrical path amount Ppsetgt. The combustion efficiency of the engine 12 can thus be improved even with the same engine power Pe, and the fuel efficiency of the engine 12 can be improved.

The overall fuel efficiency of the vehicle 8 is affected by the power transmission path of the engine power Pe. Therefore, controlling the engine operating point PNTeng to the desired operating point PNTtgt may not always maximize the overall fuel efficiency of the vehicle 8. For example, the power transmission efficiency in the electrical path may be lower than the power transmission efficiency in the mechanical path. In such a case, the overall fuel efficiency of the vehicle 8 may be higher when the engine operating point PNTeng is not controlled to the desired operating point PNTtgt than when the engine operating point PNTeng is controlled to the desired operating point PNTtgt using both the electrical path and the mechanical path, even in consideration of the fact that the engine operating point PNTeng may deviate from the desired operating point PNTtgt.

Therefore, the electronic control device 130 compares the fuel efficiency of the vehicle 8 to be obtained when the engine operating point PNTeng is controlled to the desired operating point PNTtgt and the fuel efficiency of the vehicle 8 to be obtained when the engine operating point PNTeng is not controlled to the desired operating point PNTtgt, and controls the engine operating point PNTeng so as to obtain the higher fuel efficiency of the vehicle 8 based on the comparison result.

Controlling the engine operating point PNTeng to the desired operating point PNTtgt refers to operating the TM rotating machine MGM to generate electricity so that the electrical path amount Ppse in the electrical path becomes the desired electrical path amount Ppsetgt, and driving and operating the TF rotating machine MGF as the second power source PU2. When controlling the engine operating point PNTeng to the desired operating point PNTtgt, the electronic control device 130 switches the TF clutch CF1 to the engaged state and drives and operates the TF rotating machine MGF as the second power source PU2.

When the engine operating point PNTeng is not controlled to the desired operating point PNTtgt, the power transmission efficiency in transmitting the power of the engine 12 via the torque converter 48 is considered to be higher when the lockup clutch LU is in the engaged state than when the lockup clutch LU is in the disengaged state.

A lockup point P03 in FIG. 8 indicates the engine operating point PNTeng at the time the lockup clutch LU is switched to the fully engaged state with the same required engine power Pedem at the coupling point P01 when the engine operating point PNTeng is not controlled to the desired operating point PNTtgt, namely when only the mechanical path is used. The engine speed Ne at the lockup point P03 is the turbine rotational speed Nt (=γat×No) determined based on the gear ratio γat and the AT output rotational speed No at the AT gear stage of the automatic transmission 50.

The hybrid control unit 134 determines whether the fuel efficiency of the vehicle 8 will be higher when the engine operating point PNTeng is controlled to the desired operating point PNTtgt than when the engine operating point PNTeng is not controlled to the desired operating point PNTtgt. That is, the hybrid control unit 134 determines whether controlling the engine operating point PNTeng to the desired operating point PNTtgt will improve the fuel efficiency of the vehicle 8. Specifically, the hybrid control unit 134 calculates the product of the engine efficiency and the power transmission efficiency when the engine operating point PNTeng is controlled to the desired operating point PNTtgt, as overall efficiency when the engine operating point PNTeng is controlled to the desired operating point PNTtgt. The engine efficiency in this case is predetermined engine efficiency when the engine operating point PNTeng is an optimal fuel efficiency point (see the optimal fuel efficiency point P02 in FIG. 8). The power transmission efficiency when the engine operating point PNTeng is controlled to the desired operating point PNTtgt is, for example, the sum of predetermined power transmission efficiency in the electrical path multiplied by the usage ratio of the electrical path and predetermined power transmission efficiency in the mechanical path when the engine operating point PNTeng is controlled to the desired operating point PNTtgt multiplied by the usage ratio of the mechanical path. When the engine operating point PNTeng is not controlled to the desired operating point PNTtgt, for example, when only the mechanical path is used, the hybrid control unit 134 calculates the product of the engine efficiency and the power transmission efficiency in this case as overall efficiency when only the mechanical path is used. The engine efficiency when only the mechanical path is used is, for example, predetermined engine efficiency when the engine operating point PNTeng is the lockup point (see the lockup point P03 in FIG. 8). The power transmission efficiency when only the mechanical path is used is, for example, predetermined power transmission efficiency in the mechanical path when the engine operating point PNTeng is the lockup point. The hybrid control unit 134 determines whether controlling the engine operating point PNTeng to the desired operating point PNTtgt will improve the fuel efficiency of the vehicle 8, based on whether the overall efficiency when the engine operating point PNTeng is controlled to the desired operating point PNTtgt, that is, when the electrical path is used together with the mechanical path, is higher than the overall efficiency when only the mechanical path is used.

When the hybrid control unit 134 determines that the fuel efficiency of the vehicle 8 will be lower when the engine operating point PNTeng is controlled to the desired operating point PNTtgt, namely when the electrical path is used together with the mechanical path, than when only the mechanical path is used, the hybrid control unit 134 uses only the mechanical path to transmit the power of the engine 12 via the torque converter 48 with the lockup clutch LU in the engaged state. When the hybrid control unit 134 determines that the fuel efficiency of the vehicle 8 will be lower when the electrical path is used together with the mechanical path than when only the mechanical path is used, the hybrid control unit 134 controls the engine operating point PNTeng to the lockup point that is the engine operating point PNTeng determined when only the mechanical path is used (see the lockup point P03 in FIG. 8). On the other hand, when the hybrid control unit 134 determines that the fuel efficiency of the vehicle 8 will be higher when the electrical path is used together with the mechanical path than when only the mechanical path is used, the hybrid control unit 134 operates the TM rotating machine MGM to generate electricity so that the electrical path amount Ppse in the electrical path becomes the desired electrical path amount Ppsetgt, and drives and operates the TF rotating machine MGF as the second power source PU2. When the hybrid control unit 134 determines that the fuel efficiency of the vehicle 8 will be higher when the electrical path is used together with the mechanical path than when only the mechanical path is used, the hybrid control unit 134 changes the engine operating point PNTeng from the engine operating point PNTeng determined when only the mechanical path is used to an optimal fuel efficiency point (see the optimal fuel efficiency point P02 in FIG. 8).

As described above, the fuel efficiency of the vehicle 8 to be obtained when the engine operating point PNTeng is controlled to the desired operating point PNTtgt is compared with the fuel efficiency of the vehicle 8 to be obtained when the engine operating point PNTeng is not controlled to the desired operating point PNTtgt, and the engine operating point PNTeng is controlled so as to obtain the higher fuel efficiency of the vehicle 8 based on the comparison result. Such control of the engine operating point PNTeng may be performed when the economy mode MReco is selected by the driver. The hybrid control unit 134 determines whether the drive mode MR of the vehicle 8 has been set to the economy mode MReco. When the hybrid control unit 134 determines that the drive mode MR of the vehicle 8 has been set to the economy mode MReco, the hybrid control unit 134 determines whether controlling the engine operating point PNTeng to the desired operating point PNTtgt will improve the fuel efficiency of the vehicle 8.

From another point of view, in the "H4_torque split" mode, the power running operation of the TF rotating machine MGF is controlled so that the torque split ratio Rx becomes a desired value. Accordingly, the electrical path amount Ppse is determined based on the desired value of the torque split ratio Rx when the power of the engine 12 is transmitted using the electrical path together with the mechanical path. It is therefore difficult to use the control of changing the engine operating point PNTeng to the desired operating point PNTtgt in the "H4_torque split" mode. When viewed from a different perspective, it may not be possible to control the torque split ratio Rx to the desired value when the control of changing the engine operating point PNTeng to the desired operating point PNTtgt by using the electrical path together with the mechanical path is performed in the "H4_torque split" mode. Therefore, the electronic control device 130 does not use the electrical path but uses only the mechanical path in the "H4_torque split" mode. When higher fuel efficiency of the vehicle 8 will be obtained by controlling the engine operating point PNTeng to the desired operating point PNTtgt, namely by using the electrical path together with the mechanical path, in the "H4_torque split" mode, the electronic control device 130 switches the mode from the "H4_torque split" mode to the "H4_LSD" mode.

The drive state control unit 136 determines whether the TF clutch CF1 is in the disengaged state and the torque split ratio Rx is being controlled by controlling the MGF torque Tmgf, that is, whether the current mode is the "H4_torque split" mode. When the drive state control unit 136 determines that the current mode is the "H4_torque split" mode, the hybrid control unit 134 determines whether higher fuel efficiency of the vehicle 8 will be obtained by using the electrical path together with the mechanical path. When the drive state control unit 136 determines that the current mode is the "H4_torque split" mode and the hybrid control unit 134 determines that higher fuel efficiency of the vehicle 8 will be obtained by using the electrical path together with the mechanical path, the drive state control unit 136 switches the TF clutch CF1 to the engaged state and switches the mode from the "H4_torque split" mode to the "H4_LSD" mode. The torque split ratio Rx can thus be controlled to the desired value as in the "H4_torque split" mode. When the drive state control unit 136 determines that the current mode is the "H4_torque split" mode and the hybrid control unit 134 determines that higher fuel efficiency of the vehicle 8 will be obtained by using the electrical path together with the mechanical path, the hybrid control unit 134 operates the TM rotating machine MGM to generate electricity so that the electrical path amount Ppse in the electrical path becomes the desired electrical path amount Ppsetgt, and drives and operates the TF rotating machine MGF as the second power source PU2. At this time, the hybrid control unit 134 changes the engine operating point PNTeng from the engine operating point PNTeng determined when only the mechanical path is used to the optimal fuel efficiency point (see the optimal fuel efficiency point P02 in FIG. 8). On the other hand, when the drive state control unit 136 determines that the current mode is the "H4_torque split" mode and the hybrid control unit 134 determines that the fuel efficiency of the vehicle 8 will be lower when the electrical path is used together with the mechanical path, the hybrid control unit 134 controls the engine operating point PNTeng to the lockup point that is the engine operating point PNTeng determined when only the mechanical path is used (see the lockup point P03 in FIG. 8) with the "H4_torque split" mode maintained by the drive state control unit 136.

The engaged state of the TF clutch CF1 in the "H4_LSD" mode includes the slip engaged state. Therefore, when it is not possible to appropriately control the TF clutch CF1 to the slip engaged state, it may not be possible to appropriately control the torque split ratio Rx to the desired value. Accordingly, it is better not to switch the mode from the "H4_torque split" mode to the "H4_LSD" mode.

The drive state control unit 136 determines whether it is possible to switch the TF clutch CF1 to the engaged state. That is, the drive state control unit 136 determines whether it is possible to switch the mode to "H4_LSD" mode. That is, the drive state control unit 136 determines whether it is possible to appropriately control the torque split ratio Rx to the desired value in the "H4_LSD" mode. For example, when the hydraulic oil temperature THoil is higher than normal temperature, the durability of the friction material of the TF clutch CF1 tends to decrease, and therefore it may not be possible to control the TF clutch CF1 to the slip engaged state. Alternatively, when the hydraulic oil temperature THoil is lower than normal temperature, the controllability of the TF clutch CF1 tends to deteriorate, and therefore it may not be possible to control the TF clutch CF1 to the slip engaged state. The drive state control unit 136 determines whether it is possible to switch the TF clutch CF1 to the engaged state, based on whether the hydraulic oil temperature THoil is within a predetermined temperature range in which the control state of the TF clutch CF1 is appropriately controlled.

When the drive state control unit 136 determines that it is possible to switch the TF clutch CF1 to the engaged state and the hybrid control unit 134 determines that the fuel efficiency of the vehicle 8 will be higher when the electrical path is used together with the mechanical path, the drive state control unit 136 switches the TF clutch CF1 to the engaged state and switches the mode from "H4_torque split" mode to the "H4_LSD" mode. When the drive state control unit 136 determines that it is possible to switch the TF clutch CF1 to the engaged state and the hybrid control unit 134 determines that the fuel efficiency of the vehicle 8 will be higher when the electrical path is used together with the mechanical path, the hybrid control unit 134 operates the TM rotating machine MGM to generate electricity so that the electrical path amount Ppse in the electrical path becomes the desired electrical path amount Ppsetgt, and drives and operates the TF rotating machine MGF as the second power source PU2. On the other hand, when the drive state control unit 136 determines that it is not possible to switch the TF clutch CF1 to the engaged state, the hybrid control unit 134 controls the engine 12 to the engine operating point PNTeng determined when only the mechanical path is used, in the "H4_torque split" mode.

Figure 9:
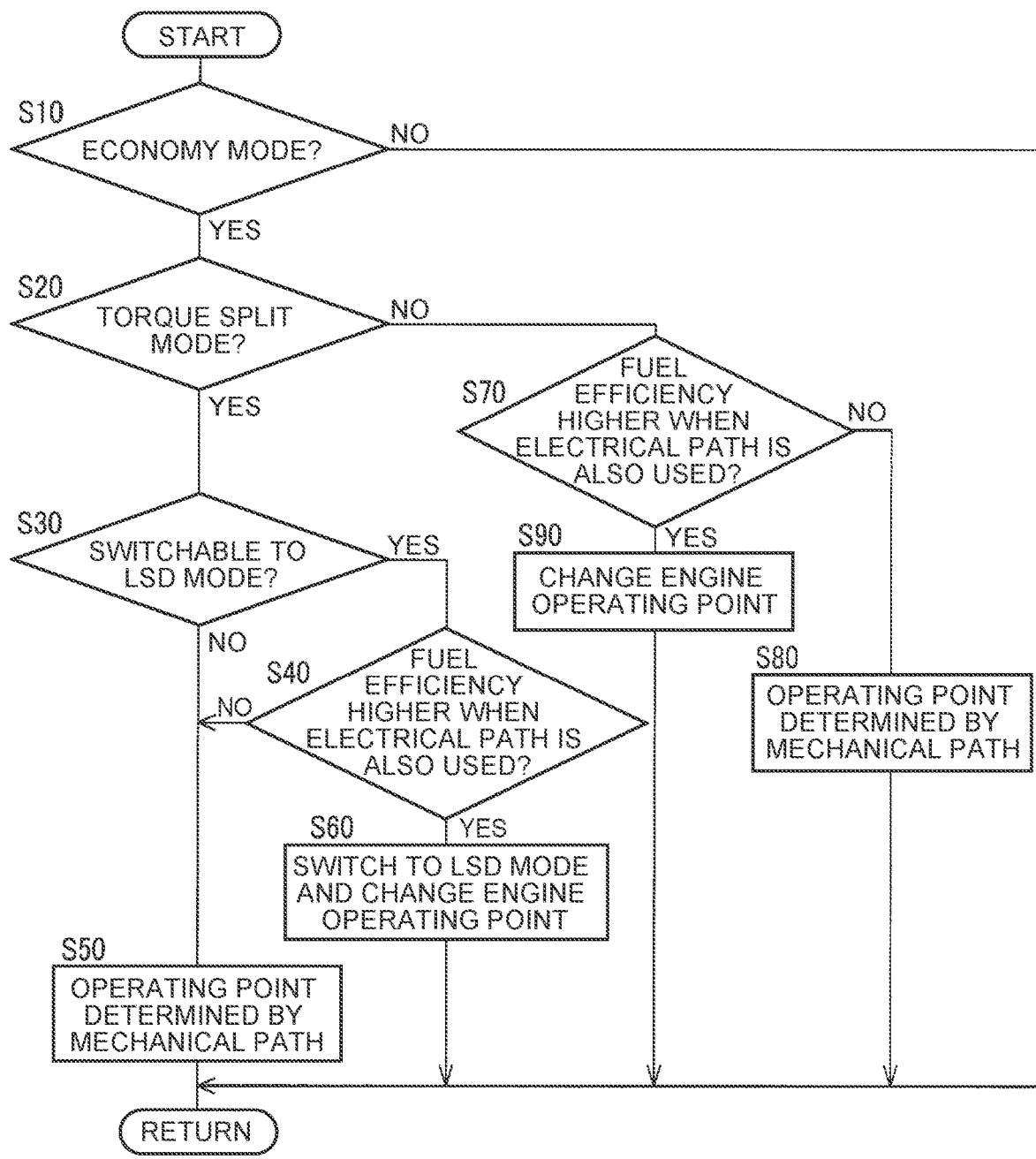
FIG. 9 is a flowchart illustrating a main part of a control operation of an electronic control device in the vehicle drive device of the first embodiment of the present disclosure, and is a flowchart illustrating the control operation for improving the overall fuel efficiency of a vehicle.

FIG. 9 is a flowchart illustrating a main part of the control operation of the electronic control device 130, and is a flowchart illustrating the control operation for improving the overall fuel efficiency of the vehicle 8. For example, this process is repeatedly performed during the engine running.

In FIG. 9, in step S10 corresponding to the function of the hybrid control unit 134 (hereinafter, the word "step" will be omitted), it is first determined whether the drive mode MR of the vehicle 8 has been set to the economy mode MReco. The routine ends when No in S10. When Yes in S10, it is determined in S20 corresponding to the function of the drive state control unit 136 whether the mode established in the transfer 28 is the "H4_torque split" mode. When Yes in S20, it is determined in S30 corresponding to the function of the drive state control unit 136 whether it is possible to switch the mode to the "H4_LSD" mode. When Yes in S30, it is determined in S40 corresponding to the function of the hybrid control unit 134 whether the fuel efficiency of the vehicle 8 will be higher when the engine operating point PNTeng is controlled to the desired operating point PNTtgt, that is, when the electrical path is used together with the mechanical path. When No in S30 or when No in S40, the engine operating point PNTeng is controlled to the engine operating point PNTeng determined when only the mechanical path is used, such as the lockup point (see the lockup point P03 in FIG. 8), while maintaining the "H4_torque split" mode in S50 corresponding to the function of the hybrid control unit 134. When Yes in S40, the mode is switched from the "H4_torque split" mode to the "H4_LSD" mode in S60 corresponding to the function of the hybrid control unit 134 and the function of the drive state control unit 136.

Moreover, the electrical path is used together with the mechanical path, and the engine operating point PNTeng is changed from the engine operating point PNTeng determined when only the mechanical path is used to the optimal fuel efficiency point (see the optimal fuel efficiency point P02 in FIG. 8). When No in S20, it is determined in S70 corresponding to the function of the hybrid control unit 134 whether the fuel efficiency of the vehicle 8 will be higher when the electrical path is used together with the mechanical path. When No in S70, the engine 12 is controlled to the engine operating point PNTeng determined when only the mechanical path is used in S80 corresponding to the function of the hybrid control unit 134. When Yes in S70, the electrical path is used together with the mechanical path and the engine operating point PNTeng is changed to the optimal fuel efficiency point in S90 corresponding to the function of the hybrid control unit 134.

As described above, according to the first embodiment, it is determined whether the fuel efficiency of the vehicle 8 will be higher when the engine operating point PNTeng is controlled to the desired operating point PNTtgt. When it is determined that the fuel efficiency of the vehicle 8 will be higher when the engine operating point PNTeng is controlled to the desired operating point PNTtgt, the TM rotating machine MGM is operated to generate electricity so that the electrical path amount Ppse in the electrical path becomes the desired electrical path amount Ppsetgt, and the TF rotating machine MGF is driven and operated as the second power source PU2. Accordingly, the overall efficiency of the vehicle 8 can be improved.

According to the first embodiment, when it is determined in the "H4_torque split" mode that the fuel efficiency of the vehicle 8 will be higher when the engine operating point PNTeng is controlled to the desired operating point PNTtgt, the TF clutch CF1 is switched to the engaged state, the mode is switched from the "H4_torque split" mode to the "H4_LSD" mode, the TM rotating machine MGM is operated to generate electricity so that the electrical path amount Ppse in the electrical path becomes the desired electrical path amount Ppsetgt, and the TF rotating machine MGF is driven and operated as the second power source PU2. Accordingly, the overall fuel efficiency of the vehicle 8 can be appropriately improved.

According to the first embodiment, in the "H4_LSD" mode, the torque split ratio Rx is controlled by controlling the control state of the TF clutch CF1 to the engaged state. Accordingly, the overall fuel efficiency of the vehicle 8 can be appropriately improved, and the same torque distribution between the front wheels 14 and the rear wheels 16 as in the "H4_torque split" mode can be maintained.

According to the first embodiment, when it is determined that it is possible to switch the mode to the "H4_LSD" mode and it is determined that the fuel efficiency of the vehicle 8 will be higher when the engine operating point PNTeng is controlled to the desired operating point PNTtgt, the TF clutch CF1 is switched to the engaged state, the TM rotating machine MGM is operated to generate electricity so that the electrical path amount Ppse in the electrical path becomes the desired electrical path amount Ppsetgt, and the TF rotating machine MGF is driven and operated as the second power source PU2. Accordingly, the overall fuel efficiency of the vehicle 8 can be appropriately improved, and torque distribution between the front wheels 14 and the rear wheels 16 can be appropriately maintained.

According to the first embodiment, whether it is possible to switch the mode to the "H4_LSD" mode is determined based on whether the hydraulic oil temperature THoil is within the predetermined temperature range. Accordingly, torque distribution between the front wheels 14 and the rear wheels 16 can be appropriately maintained when the mode is switched to the "H4_LSD" mode.

According to the first embodiment, the desired operating point PNTtgt is an optimal fuel efficiency point determined in advance as an optimal engine operating point PNTeng for improving the fuel efficiency of the engine 12. Accordingly, the overall fuel efficiency of the vehicle 8 can be appropriately improved.

According to the first embodiment, whether the fuel efficiency of the vehicle 8 will be higher when the engine operating point PNTeng is controlled to the desired operating point PNTtgt is determined when the drive mode MR of the vehicle 8 is the economy mode MReco. Accordingly, the overall fuel efficiency of the vehicle 8 can be improved according to the driver's intention.

According to the first embodiment, when it is determined that the fuel efficiency of the vehicle 8 will be lower when the engine operating point PNTeng is controlled to the desired operating point PNTtgt, the power of the engine 12 is transmitted via the torque converter 48 with the lockup clutch LU in the engaged state. Accordingly, power loss in the torque converter 48 can be reduced.

Next, other embodiments of the present disclosure will be described. In the following description, those parts common to the embodiments are denoted by the same signs, and description thereof will be omitted.

A vehicle drive device of a second embodiment of the present disclosure will be described. In the first embodiment, the electrical path is not used but only the mechanical path is used in the "H4_torque split" mode. In the second embodiment, in the "H4_torque split" mode, the engine operating point PNTeng is controlled toward an optimal fuel efficiency point by using the electrical path together with the mechanical path while controlling the torque split ratio Rx to a desired value. In the second embodiment, as in the first embodiment, the overall efficiency when the engine operating point PNTeng is controlled to the desired operating point PNTtgt is higher than the overall efficiency in the "H4_torque split" mode, the mode is switched from the "H4_torque split" mode to the "H4_LSD" mode. However, the overall efficiency in the "H4_torque split" mode is calculated in consideration of the fact that the electrical path is used together with the mechanical path. Hereinafter, the difference from the first embodiment, that is, the control operation of the electronic control device 130 in the "H4_torque split" mode, will be mainly described.

In the "H4_torque split" mode, the electronic control device 130 controls the engine 12 so that the engine operating point PNTeng becomes closer to the optimal fuel efficiency point according to the electric power (W) during the power running operation of the TF rotating machine MGF that is required to control the torque split ratio Rx to the desired value.

Figure 10:
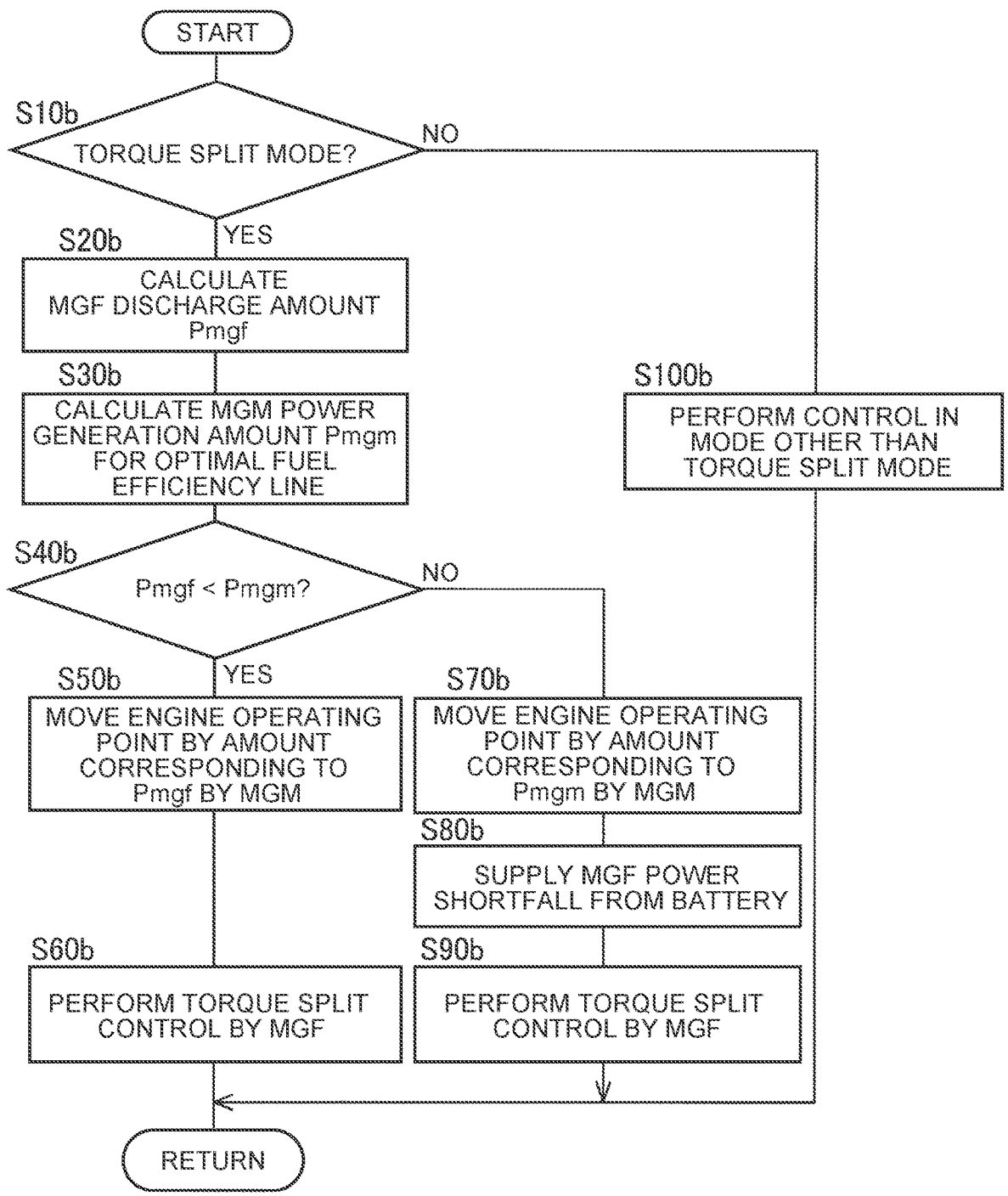
FIG. 10 is a flowchart illustrating a main part of a control operation of an electronic control device in the vehicle drive device of the second embodiment of the present disclosure, and is a flowchart illustrating the control operation for improving the overall fuel efficiency of a vehicle.

FIG. 10 is a flowchart illustrating a main part of the control operation of the electronic control device 130, and is a flowchart illustrating the control operation for improving the overall fuel efficiency of the vehicle 8. For example, this process is repeatedly performed during the engine running.

In FIG. 10, it is first determined in S10b corresponding to the function of the drive state control unit 136 whether the mode established in the transfer 28 is the "H4_torque split" mode. When Yes in S10b, an MGF discharge amount Pmgf (W) is calculated in S20b corresponding to the function of the drive state control unit 136. The MGF discharge amount Pmgf is the electric power during the power running operation of the TF rotating machine MGF that is required to control the torque split ratio Rx to the desired value in the "H4_torque split" mode. The MGF discharge amount Pmgf is, for example, the product of the MGF torque Tmgf and the MGF rotational speed Nmgf when the torque split ratio Rx is controlled to the desired value. Thereafter, an MGM power generation amount Pmgm (W) is calculated in S30b corresponding to the function of the hybrid control unit 134. The MGM power generation amount Pmgm is the electric power that is generated by the TM rotating machine MGM to change the engine operating point PNTeng from the coupling point to the optimal fuel efficiency point. The MGM power generation amount Pmgm is the product of the MGM torque Tmgm when the engine operating point PNTeng is changed from the coupling point to the optimal fuel efficiency point and the MGM rotational speed Nmgm at the optimal fuel efficiency point. Subsequently, it is determined in S40b corresponding to the function of the hybrid control unit 134 whether the MGF discharge amount Pmgf is smaller than the MGM power generation amount Pmgm. When Yes in S40b, the TM rotating machine MGM is operated to generate electricity corresponding to the MGF discharge amount Pmgf and the engine operating point PNTeng is moved from the coupling point toward the optimal fuel efficiency point in S50b corresponding to the function of the hybrid control unit 134. Since the electric power generated by the TM rotating machine MGM is less than the MGM power generation amount Pmgm, the engine operating point PNTeng cannot be moved to the optimal fuel efficiency point. The engine power Pe corresponding to the electric power generated by the TM rotating machine MGM that is less than the MGM power generation amount Pmgm is transmitted via the mechanical path. Thereafter, in S60b corresponding to the function of the drive state control unit 136, torque is distributed to the front wheels 14 and the rear wheels 16 by the MGF torque Tmgf that generates the reactive torque of the TF rotating machine MGF. Since the MGF discharge amount Pmgf is secured by the electrical path, the torque split ratio Rx can be controlled to the desired value. On the other hand, when No in S40b, the TM rotating machine MGM is operated to generate electricity corresponding to the MGM power generation amount Pmgm and the engine operating point PNTeng is moved from the coupling point to the optimal fuel efficiency point or to near the optimal fuel efficiency point in S70b corresponding to the function of the hybrid control unit 134. Thereafter, in S80b corresponding to the function of the drive state control unit 136, an MGF power shortfall (W) is supplied from the battery 24. The MGF power shortfall is the amount of electric power by which the MGM power generation amount Pmgm falls short of the MGF discharge amount Pmgf. Subsequently, in S90b corresponding to the function of the drive state control unit 136, torque is distributed to the front wheels 14 and the rear wheels 16 by the MGF torque Tmgf that generates the reactive torque of the TF rotating machine MGF. Since the MGF discharge amount Pmgf is secured by the MGM power generation amount Pmgm in the electrical path and the MGF power shortfall supplied from the battery 24, the torque split ratio Rx can be controlled to the desired value. On the other hand, when No in S1ob, control is performed in a mode other than the "H4_torque split" mode in S100b corresponding to the function of the hybrid control unit 134 and the function of the drive state control unit 136.

As described above, according to the second embodiment, the overall fuel efficiency of the vehicle 8 can be improved while controlling the torque split ratio Rx to a desired value in the "H4_torque split" mode.

Next, a vehicle drive device of a third embodiment of the present disclosure will be described. Since the vehicle drive device 10 includes the automatic transmission 50 in the stage subsequent to the torque converter 48, the range in which the engine operating point PNTeng can be moved to the optimal fuel efficiency point by the power generation operation of the TM rotating machine MGM varies depending on the AT gear stage of the automatic transmission 50. Therefore, in the third embodiment, the electronic control device 130 controls the automatic transmission 50 so that the engine operating point PNTeng becomes closer to the optimal fuel efficiency point, in addition to performing the control operation of the first embodiment or the second embodiment.

FIG. 11 illustrates the range of the engine speed Ne in each AT gear stage of the automatic transmission 50 in which the engine operating point PNTeng can be moved to the optimal fuel efficiency point by the power generation operation of the TM rotating machine MGM. In FIG. 11, "●" indicates the turbine rotational speed Nt ($=\gamma at \times No$) in each AT gear stage at the same vehicle speed V, and also indicates the engine speed Ne at the lockup point (see the lockup point P03 in FIG. 8). "o" indicates the engine speed Ne at the coupling point in each AT gear stage at the same vehicle speed V, that is, a coupling point engine speed Nec (see coupling point P01 in FIG. 8). The rotational speed shown by a dashed line is the engine speed Ne at the optimal fuel efficiency point determined by the required engine power Pedem, that is, an optimal fuel efficiency point engine speed Nes (see the optimal fuel efficiency point P02 in FIG. 8). Therefore, "•—O" indicates the range of the engine speed Ne in each AT gear stage in which the engine operating point PNTeng can be moved to the optimal fuel efficiency point by the power generation operation of the TM rotating machine MGM when the electrical path is used together with the mechanical path. "•—O" also indicates the amount of slippage of the lockup clutch LU. In the AT fourth gear stage illustrated in FIG. 11, the coupling point engine speed Nec is lower than the optimal fuel efficiency point engine speed Nes. It is therefore necessary to cause the TM rotating machine MGM to perform power running in order to move the engine operating point PNTeng from the coupling point to the optimal fuel efficiency point. Accordingly, in the AT fourth gear stage, a power circulation state occurs in which electric power is supplied to the TM rotating machine MGM. This is disadvantageous for improving the fuel efficiency. In the AT third gear stage and the AT second gear stage illustrated in FIG. 11, the coupling point engine speed Nec is higher than the optimal fuel efficiency point engine speed Nes, and the optimal fuel efficiency point engine speed Nes is within the range of the engine speed Ne in which the engine operating point PNTeng can be moved to the optimal fuel efficiency point by the power generation operation of the TM rotating machine MGM. Accordingly, in the AT third gear stage and the AT second gear stage, the engine operating point PNTeng can be moved from the coupling point to the optimal fuel efficiency point by supplying electric power from the TM rotating machine MGM to the TF rotating machine MGF by the power generation operation of the TM rotating machine MGM by using the electrical path together with the mechanical path. The fuel efficiency can thus be expected to be improved. The MGM power generation amount Pmgm for moving the engine speed Ne from the coupling point engine speed Nec to the optimal fuel efficiency point engine speed Nes is smaller in the AT third gear stage than in the AT second gear stage. In the AT first gear stage illustrated in FIG. 11, the turbine rotational speed Nt is higher than the optimal fuel efficiency point engine speed Nes, and the optimal fuel efficiency point engine speed Nes is not within the range of the engine speed Ne in which the engine operating point PNTeng can be moved to the optimal fuel efficiency point by the power generation operation of the TM rotating machine MGM. Accordingly, in the AT first gear stage, the engine operating point PNTeng cannot be moved to the optimal fuel efficiency point by using the electrical path together with the mechanical path.

Considering that the engine operating point PNTeng is moved from the coupling point to the optimal fuel efficiency point in each AT gear stage illustrated in FIG. 11, the AT third gear stage in which the TM rotating machine MGM is operated to generate electricity and the MGM power generation amount Pmgm is the smallest is most advantageous for improving the fuel efficiency.

However, the electrical path amount Ppse required in each mode of the transfer 28 does not always match the MGM power generation amount Pmgm for moving the engine operating point PNTeng to the optimal fuel efficiency point. Accordingly, in the third embodiment, the engine operating point PNTeng is controlled toward the optimal fuel efficiency point by using the electrical path together with the mechanical path while achieving the electrical path amount Ppse required in each mode of the transfer 28.

The electronic control device 130 compares the fuel efficiency of the vehicle 8 among the AT gear stages based on the electrical path amount Ppse required in each mode of the transfer 28, and selects the AT gear stage with the highest fuel efficiency.

FIG. 12 is a flowchart illustrating a main part of the control operation of the electronic control device 130, and is a flowchart illustrating the control operation for improving the overall fuel efficiency of the vehicle 8. For example, this process is repeatedly performed while the vehicle 8 is running.

In FIG. 12, each step in the flowchart corresponds to the function of the hybrid control unit 134. In S10c, the electrical path amount Ppse required in the current mode of the transfer 28 is calculated based on the vehicle state such as the accelerator operation amount θacc and the vehicle speed V. At this time, the required electrical path amount Ppse can basically be supplied from the TM rotating machine MGM to the TF rotating machine MGF. However, for example, a load factor limit may be applied to the TF rotating machine MGF to limit the MGF discharge amount Pmgf during the power running operation of the TF rotating machine MGF. In this case, the upper limit of the required electrical path amount Ppse is the limited MGF discharge amount Pmgf. For example, the load factor limit of the rotating machine is a numerical value of the amount of load allowed, and is expressed as a percentage relative to the rated load of the rotating machine. A typical example in which the load factor limit is applied to the TF rotating machine MGF is when the TF rotating machine MGF becomes hot. For example, the load factor limit for the TF rotating machine MGF is gradually reduced from the maximum of 100(%) as the temperature of the TF rotating machine MGF becomes higher in a high temperature region. The load factor limit may be applied to the TM rotating machine MGM. In this case, the upper limit of the required electrical path amount Ppse is the limited generated electric power of the TM rotating machine MGM. Thereafter, in S20c, the AT gear stage of the automatic transmission 50 in which the power can be transmitted by using the electrical path together with the mechanical path is selected. For example, when an Nth gear stage that is the current AT gear stage is the AT third gear stage, the AT second gear stage that is one gear stage lower is selected as a (N−a)th gear stage (see FIG. 11). The AT fourth gear stage illustrated in FIG. 11 is disadvantageous for improving the fuel efficiency due to the power circulation state. In the AT first gear stage illustrated in FIG. 11, the engine operating point PNTeng cannot be moved to the optimal fuel efficiency point by using the electrical path together with the mechanical path. Subsequently, in S30c, the fuel efficiency of the vehicle 8 in the Nth gear stage is calculated that will be obtained when the TM rotating machine MGM is operated to generate electricity corresponding to the electrical path amount Ppse determined in S10c and the engine operating point PNTeng is moved from the coupling point toward the optimal fuel efficiency point. Thereafter, in S40c, the fuel efficiency of the vehicle 8 in the (N−a)th gear stage is calculated that will be obtained when the TM rotating machine MGM is operated to generate electricity corresponding to the electrical path amount Ppse determined in S10c and the engine operating point PNTeng is moved from the coupling point toward the optimal fuel efficiency point. It is then determined in S50c whether the fuel efficiency of the vehicle 8 is higher in the Nth gear stage than in the (N−a)th gear stage. When Yes in S50c, the Nth gear stage is selected as the AT gear stage of the automatic transmission 50 in S60c. When the current gear stage is the Nth gear stage, the automatic transmission 50 will not be shifted. When No in S50c, the (N−a)th gear stage is selected as the AT gear stage of the automatic transmission 50 in S70c. When the current gear stage is the Nth gear stage, the automatic transmission 50 is downshifted to the (N−a)th gear stage.

In S30c to S70c, the fuel efficiency of the vehicle 8 is calculated for each AT gear stage, and the AT gear stage with the higher fuel efficiency is selected. However, the fuel efficiency of the vehicle 8 may not be calculated, and the AT gear stage in which the engine operating point PNTeng moved when the TM rotating machine MGM is operated to generate electricity corresponding to the electrical path amount Ppse determined in S10c is closer to the optimal fuel efficiency point may be selected. In the flowchart of FIG. 12, the AT third gear stage and the AT second gear stage are compared. However, for example, the AT fourth gear stage and the AT third gear stage may be compared, the AT fourth gear stage and the AT second gear stage may be compared, or the AT fourth gear stage, the AT third gear stage, and the AT second gear stage may be compared. The flowchart of FIG. 12 shows the third embodiment in which calculations are performed by the electronic control device 130 in real time. However, for example, a map of the fuel efficiency of the vehicle 8 calculated in advance for each AT gear stage may be stored in the electronic control device 130, and the AT gear stage may be selected using the map. In this case, the vehicle speed V, the required drive torque Trdem, etc. may be used as parameters for the fuel efficiency of the vehicle 8 for each AT gear stage.

As described above, according to the third embodiment, the overall fuel efficiency of the vehicle 8 can be improved while achieving the electrical path amount Ppse required in each mode of the transfer 28.

Next, a vehicle drive device of a fourth embodiment of the present disclosure will be described. FIG. 13 illustrates a schematic configuration of a transfer 200 in the fourth embodiment. The transfer 200 is different from the transfer 28 in FIG. 4. The transfer 200 is a torque splitter similar to the transfer 28. The transfer 28 in the vehicle drive device 10 is replaced with the transfer 200. In FIG. 13, the transfer 200 includes a TF input shaft 204, a differential unit 206, a TF clutch CF1, a TF brake BF1, a first output shaft 208, an intermediate shaft 210, a first positive clutch D1, a second positive clutch D2, a drive gear 212, etc. that are arranged on a common rotation axis CL1 in a transfer case 202. The differential unit 206, the TF clutch CF1, the TF brake BF1, the intermediate shaft 210, the first positive clutch D1, the second positive clutch D2, and the drive gear 212 are configured substantially symmetrically with respect to the rotation axis CL1, and their lower halves below the rotation axis CL1 are not shown in FIG. 13.

The transfer 200 further includes a second output shaft 214, a driven gear 216, etc. that are arranged on a common rotation axis CL2 in the transfer case 202. The driven gear 216 is configured substantially symmetrically with respect to the rotation axis CL2, and its upper half above the rotation axis CL2 is not shown in FIG. 13. In the transfer 200, the rotation axis CL2 is an axis of the second output shaft 214 etc.

The transfer 200 further includes a TF rotating machine MGF, a rotating machine connecting gear pair 218, a chain 220, etc. in the transfer case 202. The rotating machine connecting gear pair 218 is composed of a TF rotating machine connecting gear 218a and a TF counter gear 218b. The TF rotating machine connecting gear 218a rotates with a rotor shaft 222 of the TF rotating machine MGF, and the TF counter gear 218b constantly meshes with the TF rotating machine connecting gear 218a. The chain 220 is a member that connects the drive gear 212 and the driven gear 216.

Like the transfer 28 in FIG. 4, the transfer 200 further includes a switching actuator (not shown) fixed to the transfer case 202. The switching actuator is an actuator for operating the first positive clutch D1 and the second positive clutch D2. A first sleeve d1s of the first positive clutch D1 is moved in the rotation axis CL1 direction by the switching actuator. A second sleeve d2s of the second positive clutch D2 is moved in the rotation axis CL1 direction by the switching actuator.

The TF input shaft 204 is connected to the transmission output shaft 54 so that the transmission output shaft 54 can transmit power to the TF input shaft 204. The first output shaft 208 is connected to the rear propeller shaft 32 so that the first output shaft 208 can transmit power to the rear propeller shaft 32. The second output shaft 214 is connected to the front propeller shaft 30 so that the second output shaft 214 can transmit power to the front propeller shaft 30. The driven gear 216 is fixed to the second output shaft 214 so as not to be rotatable relative to the second output shaft 214. The TF counter gear 218b is fixed to the intermediate shaft 210 so as not to be rotatable relative to the intermediate shaft 210.

The differential unit 206 is a single-pinion planetary gear unit, and includes a sun gear S, a carrier CA, and a ring gear R. The sun gear S is fixed to the intermediate shaft 210 so as not to be rotatable relative to the intermediate shaft 210. Therefore, the TF rotating machine MGF is connected to the sun gear S via the rotating machine connecting gear pair 218. The carrier CA is fixed to the first output shaft 208 so as not to be rotatable relative to the first output shaft 208. The ring gear R is selectively connected to the transfer case 202 via the TF brake BF1. The sun gear S and the carrier CA are selectively connected via the TF clutch CF1.

First meshing teeth a1 of the first positive clutch D1 are fixed to the TF input shaft 204 so as not to be rotatable relative to the TF input shaft 204. Second meshing teeth a2 of the first positive clutch D1 are fixed to the first output shaft 208 so as not to be rotatable relative to the first output shaft 208. Third meshing teeth a3 of the first positive clutch D1 are fixed to the intermediate shaft 210 so as not to be rotatable relative to the intermediate shaft 210. In FIG. 13, a plurality of the first sleeves d1s of the first positive clutch D1 is illustrated for convenience in order to show a first state [1] and a second state [2].

Fourth meshing teeth a4 of the second positive clutch D2 are connected to the ring gear R. Fifth meshing teeth a5 of the second positive clutch D2 are fixed to the first output shaft 208 so as not to be rotatable relative to the first output shaft 208. Sixth meshing teeth a6 of the second positive clutch D2 are connected to the drive gear 212. In FIG. 13, a plurality of the second sleeves d2s of the second positive clutch D2 is illustrated for convenience in order to show a first state [1], a second state [2], and a third state [3].

Figures 14, 15:
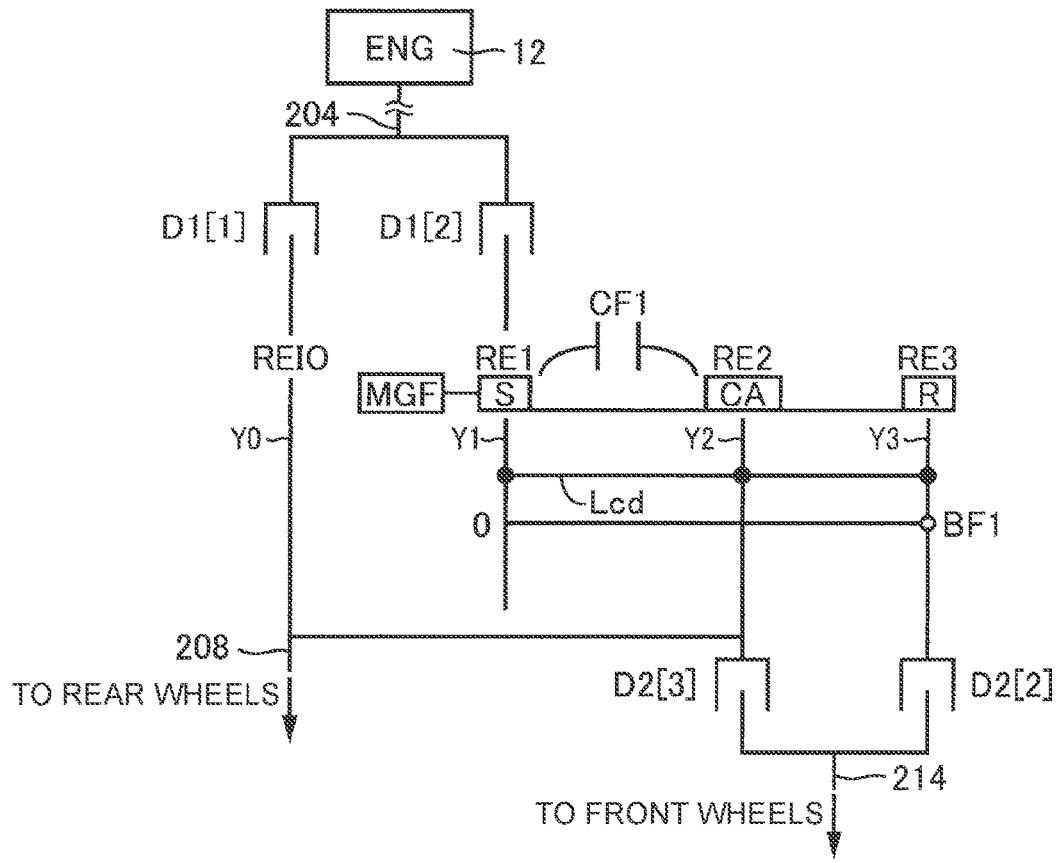
FIG. 14 is a collinear diagram showing the relative relationship among the rotational speeds of rotating elements in the transfer in FIG. 13.
FIG. 15 is an operation engagement table illustrating the relationship between each mode established in the transfer in FIG. 13 and the control state of each engagement device in the transfer.

FIG. 14 is a collinear diagram showing the relative relationship among the rotational speeds of the rotating elements in the transfer 200. In FIG. 14, three vertical lines Y1, Y2, and Y3 corresponding to the three rotating elements of the differential unit 206 of the transfer 200 are axes representing from left to right the rotational speed of the sun gear S corresponding to a first rotating element RE1, the rotational speed of the carrier CA corresponding to a second rotating element RE2, and the rotational speed of the ring gear R corresponding to a third rotating element RE3, respectively. A vertical line Y0 shown to the left of the vertical line Y1 is an axis representing the rotational speed of the first output shaft 208 corresponding to an input and output rotating element REIO.

As expressed using the collinear diagram of FIG. 14, in the transfer 200, the input and output rotating element REIO is selectively connected to the TF input shaft 204 via the first positive clutch D1 (see the first state [1]), and is connected to the rear propeller shaft 32. The first power source PU1 including the engine 12 is connected to the TF input shaft 204 via the hybrid transmission 26 so that the first power source PU1 can transmit power to the TF input shaft 204. In the differential unit 206, the TF rotating machine MGF is connected to the first rotating element RE1 so that the TF rotating machine MGF can transmit power to the first rotating element RE1, and the first rotating element RE1 is selectively connected to the TF input shaft 204 via the first positive clutch D1 (see the second state [2]). The second rotating element RE2 is connected to the first output shaft 208, namely the rear propeller shaft 32, and is selectively connected to the second output shaft 214, namely the front propeller shaft 30, via the second positive clutch D2 (see the third state [3]). The third rotating element RE3 is selectively connected to the second output shaft 214 via the second positive clutch D2 (see the second state [2]) and is selectively connected to the transfer case 202 via the TF brake BF1. The first rotating element RE1 and the second rotating element RE2 are selectively connected via the TF clutch CF1. In the differential unit 206, a straight line Lcd represents the relationship among the rotational speeds of the first rotating element RE1, the second rotating element RE2, and the third rotating element RE3. The first output shaft 208 is an output shaft to which the power from the first power source PU1 is input via the torque converter 48 and which outputs the power to the rear wheels 16. The second output shaft 214 is an output shaft that outputs the power to the front wheels 14.

The differential unit 206 functions as a transmission that selectively forms a high gear stage and a low gear stage. The high gear stage is formed by switching the TF clutch CF1 to the engaged state, and the low gear stage is formed by switching the TF brake BF1 to the engaged state.

Accordingly, the differential unit 206 functions as a center differential. In this case, when the first positive clutch D1 is in the first state [1] and the second positive clutch D2 is in the second state [2] in the transfer 200, the differential unit 206 can distribute the torque of the first power source PU1 input to the second rotating element RE2 to the third rotating element RE3 by reactive torque of the TF rotating machine MGF connected to the first rotating element RE1. The differential unit 206 can also distribute the torque of the first power source PU1 input to the second rotating element RE2 to the third rotating element RE3 by controlling the TF clutch CF1 to the engaged state (slip engaged state or fully engaged state) to limit the differential action of the differential unit 206, rather than by applying the reactive torque of the TF rotating machine MGF. As described above, the transfer 200 is a torque splitter that distributes a part of the torque of the first power source PU1 input to the first output shaft 208 to the second output shaft 214. The transfer 200 can thus distribute the torque between the front wheels 14 and the rear wheels 16. When the second positive clutch D2 of the transfer 200 is switched to the third state [3], the differential unit 206 is switched to a differential lock state in which the differential unit 206 does not function as a center differential.

FIG. 15 is an operation engagement table illustrating the relationship between each mode established in the transfer 200 and the control state of each engagement device in the transfer 200. In FIG. 15, "O" indicates engaged or the meshing teeth being coupled, and a blank indicates disengaged. "(O)" indicates the box can be blank when the first positive clutch D1 can be switched to the disengaged state. The operation engagement table of FIG. 15 is different from FIG. 6 mainly in that the mode of number m1 is an "EV (FR) high" mode instead of the "EV (FF) high" mode and the mode of number m2 is an "EV (FR) low" mode instead of the "EV (FF) low" mode. The differences of FIG. 15 from FIG. 6 will be described.

Each of the "EV (FR) high" mode of number m1 and the "EV (FR) low" mode of number m2 is a TrEV mode. In the "EV (FR) high" mode and the "EV (FR) low" mode, the second positive clutch D2 is switched to the first state [1]. Coupling between the fourth meshing teeth a4, the fifth meshing teeth a5, and the sixth meshing teeth a6 is thus switched to the neutral state ("N" in the figure). Accordingly, the power transmission path between the differential unit 206 and the front wheels 14 is disconnected. In this state, the differential unit 206 that has formed the high gear stage with the TF clutch CF1 in the engaged state or that has formed the low gear stage with the TF brake BF1 in the engaged state transmits the power from the TF rotating machine MGF to the rear wheel 16 side. Accordingly, the BEV running of the fourth embodiment is implemented by running with rear-wheel drive. In the TrEV mode, when, for example, the first positive clutch D1 is in the first state [1], dragging of the engine 12 can be eliminated by switching the automatic transmission 50 to the neutral state. Alternatively, when it is possible to switch the first positive clutch D1 to the disengaged state, dragging of the automatic transmission 50 and the engine 12 can be eliminated in the TrEV mode regardless of the state of the automatic transmission 50 by switching, for example, the first positive clutch D1 to the disengaged state. In the TrEV mode, namely in each of the "EV (FR) high" mode and the "EV (FR) low" mode, the automatic transmission 50 is in the power transmittable state, so that the automatic transmission 50 can transmit the power from the first power source PU1 to the rear wheels 16. Accordingly, the vehicle 8 can perform the engine running, namely the HEV running. In the engine running, the vehicle 8 can perform, for example, running with rear-wheel drive by parallel hybrid running, or running with rear-wheel drive using only the power from the first power source PU1.

An "H4_torque split" mode of number m3 is a mode in which, for example, with the differential unit 206 being in a state equivalent to the high gear stage, the sun gear S receives the torque of the first power source PU1 transferred from the first output shaft 208 to the differential unit 206 due to the reactive torque of the TF rotating machine MGF, so that the torque is distributed to the front wheels 14 and the rear wheels 16 at any desired ratio according to the reactive torque of the TF rotating machine MGF. In the transfer 200, the TF rotating machine MGF is caused to regenerate electricity in the "H4_torque split" mode. The electricity regenerated by the TF rotating machine MGF is stored in, for example, the battery 24.

An "H4_LSD" mode of number m4 is a mode in which torque is distributed to the front wheels 14 and the rear wheels 16 at any desired ratio according to the torque capacity of the TF clutch CF1 by controlling the TF clutch CF1 to the engaged state (slip engaged state or fully engaged state) to limit the differential action of the differential unit 206, rather than by applying the reactive torque of the TF rotating machine MGF as in the "H4_torque split" mode. In the "H4_LSD" mode, the power from the TF rotating machine MGF can be added to drive torque Tr.

An "H4_Lock" mode of number m5 is a mode in which, with the differential unit 206 switched to the differential lock state, the torque of the first power source PU1 transferred to the first output shaft 208 is distributed to the front wheels 14 and the rear wheels 16. In the "H4_Lock" mode, the power from the TF rotating machine MGF can be added to the driving torque Tr by, for example, switching the TF clutch CF1 to the engaged state.

An "L4_Lock" mode of number m6 is a mode in which, with the differential unit 206 switched to the differential lock state and forming the low gear stage, the torque of the first power source PU1 transferred to the sun gear S of the differential unit 206 is distributed to the front wheels 14 and the rear wheels 16. In the "L4_Lock" mode, the power from the TF rotating machine MGF can be added to the driving torque Tr.

In the transfer 200 of the fourth embodiment, the TF rotating machine MGF is operated to regenerate electricity in the "H4_torque split" mode. In the second embodiment, however, in the "H4_torque split" mode, the electric power generated by the TM rotating machine MGM is supplied as electric power for the power running operation of the TF rotating machine MGF by using the electrical path together with the mechanical path. Therefore, the second embodiment cannot be applied to the fourth embodiment.

Figure 16:
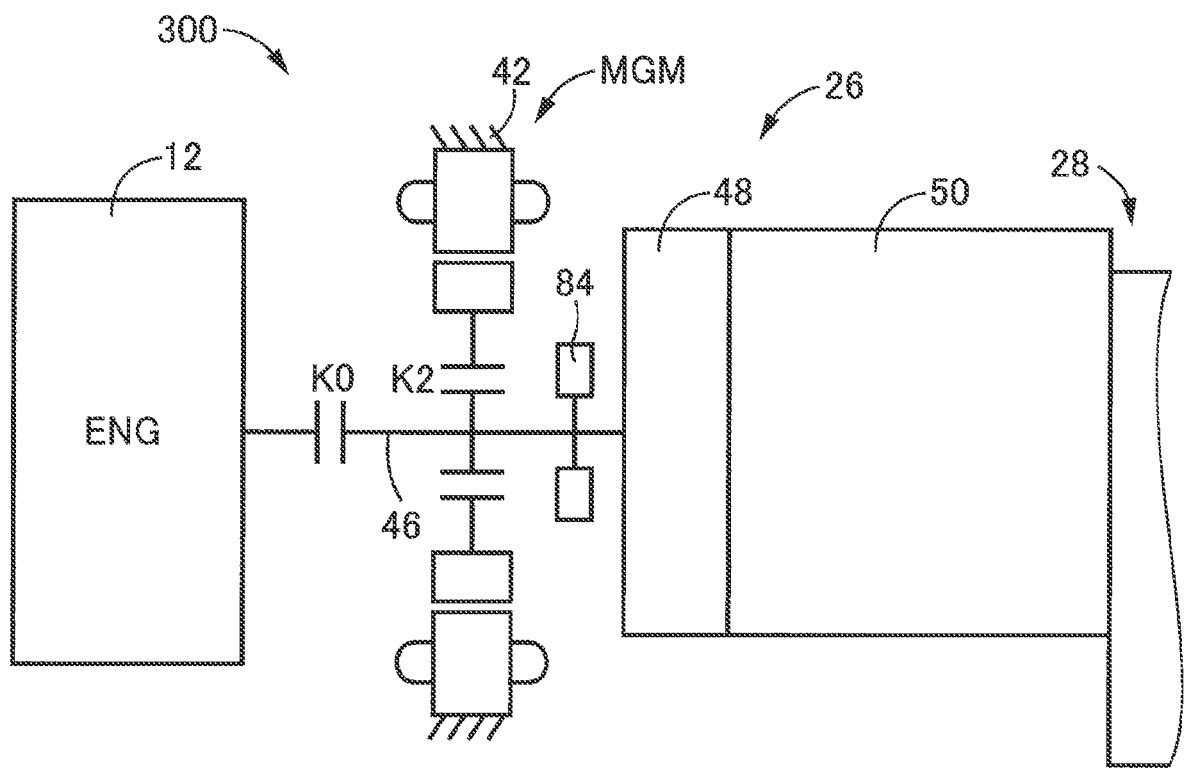
FIG. 16 illustrates a schematic configuration of a transmission system of the fifth embodiment of the present disclosure.

Next, a vehicle drive device of a fifth embodiment of the present disclosure will be described. FIG. 16 illustrates a schematic configuration of a transmission system 300 in the vehicle drive device of the fifth embodiment of the present disclosure. In FIG. 16, the transmission system 300 is different from the transmission system 18 mainly in that the transmission system 300 includes an engine disconnect clutch K0 and a rotating machine disconnect clutch K2.

Specifically, the transmission system 300 includes the engine disconnect clutch K0 and the rotating machine disconnect clutch K2 in the transmission case 42. The engine disconnect clutch K0 is a clutch that disconnects the engine 12 from the rotating machine connecting shaft 46. The rotating machine disconnect clutch K2 is a clutch that disconnects the TM rotating machine MGM from the rotating machine connecting shaft 46.

In the TrEV mode, namely in each of the "EV (FF) high" mode and the "EV (FF) low" mode shown in FIG. 6 or in each of the "EV (FR) high" mode and the "EV (FR) low" mode shown in FIG. 15, when, for example, the first positive clutch D1 is in the first state [1], dragging of the engine 12 can be eliminated by switching the engine disconnect clutch K0 to the disengaged state. At this time, the vehicle 8 can perform the BEV running using the power from the two rotating machines, namely the TM rotating machine MGM and the TF rotating machine MGF, by causing the TM rotating machine MGM to perform power running without idling. In the TrEV mode, by switching the rotating machine disconnect clutch K2 to the disengaged state, dragging of the TM rotating machine MGM can be eliminated without controlling the TM rotating machine MGM to idle.

Although the first to fifth embodiments of the present disclosure are described in detail with reference to the drawings, the present disclosure is also applicable to other modes.

For example, in the first embodiment, the engine operating point PNTeng determined when only the mechanical path is used is the lockup point. However, the present disclosure is not limited to this mode. For example, when the fuel efficiency of the vehicle 8 is higher at the coupling point than at the lockup point, the engine operating point PNTeng determined when only the mechanical path is used may be the coupling point.

In the first and fourth embodiments, the transfer 28, 200 need only include at least the TF clutch CF1 out of the TF clutch CF1 and the TF brake BF1.

In the first and fourth embodiments, the differential unit 64, 206 may function as a three or more-speed transmission, or may function as a continuously variable transmission.

In the first and fourth embodiments, the TF clutch CF1 may be a clutch that selectively connects the first rotating element RE1 and the third rotating element RE3 of the differential unit 64, 206, or may be a clutch that selectively connects the second rotating element RE2 and the third rotating element RE3 of the differential unit 64, 206. In other words, the TF clutch CF1 may be a clutch that selectively connects any two of the first, second, and third rotating elements RE1, RE2, and RE3.

In the first and fourth embodiments, the vehicle drive device may be a drive device configured so that the first output shaft 66, 208 is an output shaft that outputs the power of the first power source PU1 received via the torque converter 48 to the front wheels, and the second output shaft 72, 214 is an output shaft that outputs the power to the rear wheels.

The transmission system 300 including the engine disconnect clutch K0 and the rotating machine disconnect clutch K2 is illustrated in the fifth embodiment. However, the present disclosure is not limited to this mode. For example, from the viewpoint that the engine 12 need only be disconnectable from the drive system, the transmission system 300 may not include the rotating machine disconnect clutch K2 and may need only include the engine disconnect clutch K0.

In the above embodiments, the automatic transmission 50 may be a known synchromesh parallel two-axis automatic transmission including a dual clutch transmission (DCT), a known belt type continuously variable transmission, etc.

In the above embodiments, the torque converter 48 is used as a hydraulic transmission. However, the present disclosure is not limited to this mode. For example, other hydraulic transmission such as a fluid coupling having no torque amplification function may be used instead of the torque converter 48.

The foregoing is by way of example only, and the present disclosure can be implemented in various modified and improved modes based on the knowledge of those skilled in the art.

What is claimed is:

1. A vehicle drive device, comprising:
   a first power source including an engine and a first rotating machine;
   a hydraulic transmission configured to transmit power from the first power source via a fluid;
   a first output shaft configured to receive the power from the first power source via the hydraulic transmission and output the power to one of a front wheel and a rear wheel;
   a second output shaft configured to output the power to another of the front wheel and the rear wheel;
   a torque splitter configured to distribute a part of torque input to the first output shaft to the second output shaft, the torque splitter including a second rotating machine, a differential unit, and an engagement device, the differential unit including a first rotating element to which the second rotating machine is connected, a second rotating element to which one of the first output shaft and the second output shaft is connected, and a third rotating element to which another of the first output shaft and the second output shaft is connected, and the engagement device being configured to selectively connect any two of the first rotating element, the second rotating element, and the third rotating element; and an electronic control device configured to: when the engagement device is in a disengaged state, control a torque split ratio by controlling output torque of the second rotating machine, the torque split ratio being a ratio of distribution of torque between the front wheel and the rear wheel; when the engagement device is in an engaged state, control an operating point of the engine by adjusting an electrical path amount and using the second rotating machine as a second power source, the electrical path amount being a magnitude of electric power in an electrical path through which the electric power is transferred between the first rotating machine and the second rotating machine; determine whether fuel efficiency of a vehicle is improved by operating the first rotating machine to generate electricity to such an extent that the electrical path amount becomes a desired electrical path amount for controlling the operating point of the engine to a desired operating point and driving and operating the second rotating machine as the second power source; and when the electronic control device determines that the fuel efficiency of the vehicle is improved, operate the first rotating machine to generate electricity to such an extent that the electrical path amount becomes the desired electrical path amount and drive and operate the second rotating machine as the second power source.

2. The vehicle drive device according to claim 1, wherein the electronic control device is configured to, when the electronic control device determines, while the engagement device is in the disengaged state and the electronic control device is controlling the torque split ratio by controlling the output torque of the second rotating machine, that the fuel efficiency of the vehicle is improved by operating the first rotating machine to generate electricity to such an extent that the electrical path amount becomes the desired electrical path amount and driving and operating the second rotating machine as the second power source, switch the engagement device to the engaged state, operate the first rotating machine to generate electricity to such an extent that the electrical path amount becomes the desired electrical path amount, and drive and operate the second rotating machine as the second power source.

3. The vehicle drive device according to claim 2, wherein:
the engaged state of the engagement device includes a slip engaged state in which the engagement device is engaged with slippage, and a fully engaged state in which the engagement device is fully engaged; and
the electronic control device is configured to control the torque split ratio by controlling a control state of the engagement device to the engaged state.

4. The vehicle drive device according to claim 3, wherein the electronic control device is configured to:
determine whether the engagement device is switchable to the engaged state; and
when the electronic control device determines that the engagement device is switchable to the engaged state and determines that the fuel efficiency of the vehicle is improved by operating the first rotating machine to generate electricity to such an extent that the electrical path amount becomes the desired electrical path amount and driving and operating the second rotating machine as the second power source, switch the engagement device to the engaged state, operate the first rotating machine to generate electricity to such an extent that the electrical path amount becomes the desired electrical path amount, and drive and operate the second rotating machine as the second power source.

5. The vehicle drive device according to claim 4, wherein:
the engagement device is a hydraulic friction engagement device; and
the electronic control device is configured to determine whether the engagement device is switchable to the engaged state, based on whether a temperature of oil for operating the engagement device is within a predetermined temperature range in which an operating state of the engagement device is appropriately controlled.

6. The vehicle drive device according to claim 1, wherein the desired operating point is an optimal fuel efficiency point determined in advance as an optimal operating point for improving fuel efficiency of the engine.

7. The vehicle drive device according to claim 1, wherein the electronic control device is configured to make the determination as to whether the fuel efficiency of the vehicle is improved, when a current drive mode of the vehicle is a predetermined drive mode that focuses more on fuel efficiency performance than on power performance.

8. The vehicle drive device according to claim 1, wherein:
the hydraulic transmission includes a direct connection clutch that is configured to connect an input-side rotating element and an output-side rotating element; and
the electronic control device is configured to, when the electronic control device determines that the fuel efficiency of the vehicle is not improved by operating the first rotating machine to generate electricity to such an extent that the electrical path amount becomes the desired electrical path amount and driving and operating the second rotating machine as the second power source, transmit power of the engine via the hydraulic transmission with the direct connection clutch in an engaged state.

9. A control method for a vehicle drive device, the vehicle drive device including
a first power source including an engine and a first rotating machine,
a hydraulic transmission configured to transmit power from the first power source via a fluid,
a first output shaft configured to receive the power from the first power source via the hydraulic transmission and output the power to one of a front wheel and a rear wheel, a second output shaft configured to output the power to another of the front wheel and the rear wheel, and
a torque splitter configured to distribute a part of torque input to the first output shaft to the second output shaft, the torque splitter including a second rotating machine, a differential unit, and an engagement device, the differential unit including a first rotating element to which the second rotating machine is connected, a second rotating element to which one of the first output shaft and the second output shaft is connected, and a third rotating element to which another of the first output shaft and the second output shaft is connected, and the engagement device being configured to selectively connect any two of the first rotating element, the second rotating element, and the third rotating element, the control method comprising:

when the engagement device is in a disengaged state, controlling a torque split ratio by controlling output torque of the second rotating machine), the torque split ratio being a ratio of distribution of torque between the front wheel and the rear wheel;

when the engagement device is in an engaged state, controlling an operating point of the engine by adjusting an electrical path amount and using the second rotating machine as a second power source, the electrical path amount being a magnitude of electric power in an electrical path through which the electric power is transferred between the first rotating machine and the second rotating machine;

determining whether fuel efficiency of a vehicle is improved by operating the first rotating machine to generate electricity to such an extent that the electrical path amount becomes a desired electrical path amount for controlling the operating point of the engine to a desired operating point and driving and operating the second rotating machine as the second power source; and when it is determined that the fuel efficiency of the vehicle is improved, operating the first rotating machine to generate electricity to such an extent that the electrical path amount becomes the desired electrical path amount and driving and operating the second rotating machine as the second power source.

* * * * *